United States Patent
Wada et al.

(10) Patent No.: US 10,998,842 B2
(45) Date of Patent: May 4, 2021

(54) POWER CONVERSION DEVICE, MOTOR DRIVE UNIT, AND ELECTRIC POWER STEERING DEVICE

(71) Applicant: Nidec Corporation, Kyoto (JP)

(72) Inventors: Eiji Wada, Kawasaki (JP); Hiromitsu Ohashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 179 days.

(21) Appl. No.: 16/461,843

(22) PCT Filed: Dec. 22, 2017

(86) PCT No.: PCT/JP2017/046081
§ 371 (c)(1),
(2) Date: May 17, 2019

(87) PCT Pub. No.: WO2018/123849
PCT Pub. Date: Jul. 5, 2018

(65) Prior Publication Data
US 2019/0372501 A1    Dec. 5, 2019

(30) Foreign Application Priority Data

Dec. 26, 2016  (JP) .............................. JP2016-251508

(51) Int. Cl.
*H02P 27/08*  (2006.01)
*B62D 5/04*  (2006.01)
(Continued)

(52) U.S. Cl.
CPC ............ *H02P 27/08* (2013.01); *B62D 5/0403* (2013.01); *B62D 5/0463* (2013.01); *H02M 7/53871* (2013.01); *H02P 25/22* (2013.01)

(58) Field of Classification Search
CPC ....... H02P 27/08; H02P 25/22; B62D 5/0403; B62D 5/0463; H02M 7/53871
See application file for complete search history.

(56) References Cited

U.S. PATENT DOCUMENTS

2013/0094266 A1  4/2013  Balpe
2016/0134212 A1*  5/2016  Kikuchi ............... H02H 7/1225
                                                             318/400.21
(Continued)

FOREIGN PATENT DOCUMENTS

CN         102939714 A     2/2013
CN         105409112 A     3/2016
(Continued)

OTHER PUBLICATIONS

Official Communication issued in corresponding Chinese Patent Application No. 201780080409.0, dated Jul. 28, 2020.
(Continued)

*Primary Examiner* — Zoheb S Imtiaz
(74) *Attorney, Agent, or Firm* — Keating & Bennett

(57) ABSTRACT

A power conversion device includes a first inverter connected to first ends of windings of each phase of a motor, a second inverter connected to second ends of the windings of each phase, a phase separation relay circuit to switch between connection and disconnection between the first ends of the windings of each phase and the first inverter, a neutral point relay circuit connected to the first ends of the windings of each phase and to switch between connection and disconnection between the first ends of the windings of each phase, a first switching element to switch between connection and disconnection between the second inverter and a power supply, and a second switching element to switch between connection and disconnection between the second inverter and a ground.

15 Claims, 16 Drawing Sheets

(51) Int. Cl.
*H02M 7/5387* (2007.01)
*H02P 25/22* (2006.01)

(56) References Cited

U.S. PATENT DOCUMENTS

2016/0173020 A1   6/2016  Kanekawa et al.
2017/0237377 A1*  8/2017  Furukawa ............... H02P 29/00
                                                   318/564

FOREIGN PATENT DOCUMENTS

JP       07-099959 B2   10/1995
JP       2014-192950 A  10/2014

OTHER PUBLICATIONS

Official Communication issued in International Patent Application No. PCT/JP2017/046081, dated Feb. 27, 2018.

\* cited by examiner

POWER CONVERSION DEVICE, MOTOR DRIVE UNIT, AND ELECTRIC POWER STEERING DEVICE

CROSS REFERENCE TO RELATED APPLICATIONS

This is the U.S. national stage of application No. PCT/JP2017/046081, filed on Dec. 22, 2017, and priority under 35 U.S.C. § 119(a) and 35 U.S.C. § 365(b) is claimed from Japanese Application No. 2016-251508, filed Dec. 26, 2016; the contents of which are incorporated herein by reference.

1. FIELD OF THE INVENTION

The present disclosure relates to a power conversion device, a motor drive unit, an electric power steering device, and a relay module to convert power supplied to an electric motor.

2. BACKGROUND

Electric motors such as brushless direct current (DC) motors and alternating current (AC) synchronous motors (hereinafter simply referred to as "motors") are generally driven by a three-phase current. Complex control techniques such as vector control are used to accurately control a three-phase current waveform. Such control techniques require a high degree of mathematical operation, and a digital operation circuit such as a microcontroller (microcomputer) is used. Vector control technology is utilized in fields where motor load variation is large, e.g., washing machines, electrically-assisted bicycles, electric scooters, electric power steering devices, electric vehicles, industrial equipment, and the like. Meanwhile, for a motor with a relatively small output, a different motor control method, such as a pulse width modulation (PWM) method, is adopted.

In the in-vehicle field, an electrical control unit (ECU) for automobiles is used for a vehicle. The ECU includes a microcontroller, a power supply, an input/output circuit, an analog-digital (AD) convertor, a load drive circuit, a read only memory (ROM), and the like. An electronic control system is built around the ECU. For example, the ECU processes a signal from a sensor to control an actuator such as a motor. Specifically, the ECU controls an inverter in a power conversion device while monitoring a rotational speed or torque of a motor. Under control of the ECU, the power conversion device converts drive power supplied to the motor.

In recent years, a mechanically and electrically integrated motor in which a motor, a power conversion device, and an ECU are integrated has been developed. Particularly, in the in-vehicle field, high quality assurance is required from the viewpoint of safety. For that reason, a redundant design has been adopted in which a safe operation can be continued even in the case in which a part of a component fails. As an example of redundant design, providing two power conversion devices for a single motor has been considered. As another example, providing a backup microcontroller in a main microcontroller has been taken into consideration.

Each of two inverters is connected to a power supply and a ground (hereinafter referred to as "GND"). One inverter is connected to one end of a three-phase winding of the motor, and the other inverter is connected to the other end of the three-phase winding. Each inverter includes a bridge circuit formed of three legs, each of which includes a high side switching element and a low side switching element. In the case in which a failure of a switching element in the two inverters is detected, the controller switches motor control from control at a normal time to control at an abnormal time. In the present specification, "abnormal" mainly means a failure of a switching element. Also, "control at a normal time" means control in a state in which all of the switching elements are normal, and "control at an abnormal time" means control in a state in which a failure has occurred in a certain switching element.

In the control at the abnormal time, in an inverter including a failed switching element (hereinafter referred to as a "failed inverter) of the two inverters, a neutral point of windings is configured by turning the switching elements on or off according to a predetermined rule. According to the rule, for example, in the case of an open failure in which a high side switching element is turned off at all times, in the bridge circuit of the inverter, switching elements other than the failed switching element are turned off among the three high side switching elements, and the three low side switching elements are turned on. In that case, the neural point is configured on the low side.

Alternatively, in the case of a short failure in which a high side switching element is turned on at all times, in the bridge circuit of the inverter, switching elements other than the failed switching element are turned on among the three high side switching elements, and the three low side switching elements are turned off. In that case, the neutral point is configured on the high side.

SUMMARY

In the above-described related art, further improvement of current control at the normal time and the abnormal time is in demand.

A power conversion device according to an example embodiment of the present disclosure is a power conversion device that converts power from a power supply to power supplied to a motor having n-phase (n is an integer of 3 or more) windings, the power conversion device including a first inverter connected to first ends of the windings of each phase of the motor, a second inverter connected to second ends of the windings of each phase, a phase separation relay circuit to switch between connection and disconnection between the first ends of the windings of each phase and the first inverter, a neutral point relay circuit connected to the first ends of the windings of each phase and to switch between connection and disconnection between the first ends of the windings of each phase, a first switching element to switch between connection and disconnection between the second inverter and the power supply, and a second switching element to switch between connection and disconnection between the second inverter and a ground.

The above and other elements, features, steps, characteristics and advantages of the present disclosure will become more apparent from the following detailed description of the example embodiments with reference to the attached drawings.

DETAILED DESCRIPTION

Before describing example embodiments of the present disclosure, the inventor's knowledge of the present application on which the present disclosure is based will be described.

The inventor of the present application has found a problem that, even when a neutral point is configured in a failed inverter at an abnormal time, the failed inverter draws a current from the power supply. Consequently, power loss occurs in the failed inverter.

Like the power supply, it is also not possible to disconnect the connection between a failed inverter and the GND. The inventor of the present application has found a problem that, even when a neutral point is configured in a failed inverter at an abnormal time, a current supplied to windings of each phase through a normal inverter does not return to an inverter of a supply source and flows from the failed inverter to the GND. In other words, it is not possible to form a closed loop of drive current. It is desirable that the current supplied from the normal inverter to the windings of each phase flows to the GND through the inverter of the supply source.

Hereinafter, example embodiments of a power conversion device, a motor drive unit, an electric power steering device, and a relay module of the present disclosure will be described in detail with reference to the accompanying drawings. However, description that is more detailed than necessary may be omitted in some cases. For example, detailed description of already well-known matters or redundant description of substantially the same configuration may be omitted in some cases. This is to avoid unnecessary redundancy in the following description and to facilitate understanding by those of ordinary skill in the art.

In the present specification, example embodiments of the present disclosure will be described by taking a power conversion device which converts power supplied to a three-phase motor having three-phase (U-phase, V-phase, W-phase) windings as an example. However, a power conversion device which converts power supplied to an n-phase motor having windings of n phases (n is an integer of 4 or more), such as four phases or five phases, is also within the scope of the present disclosure.

Figure 1:
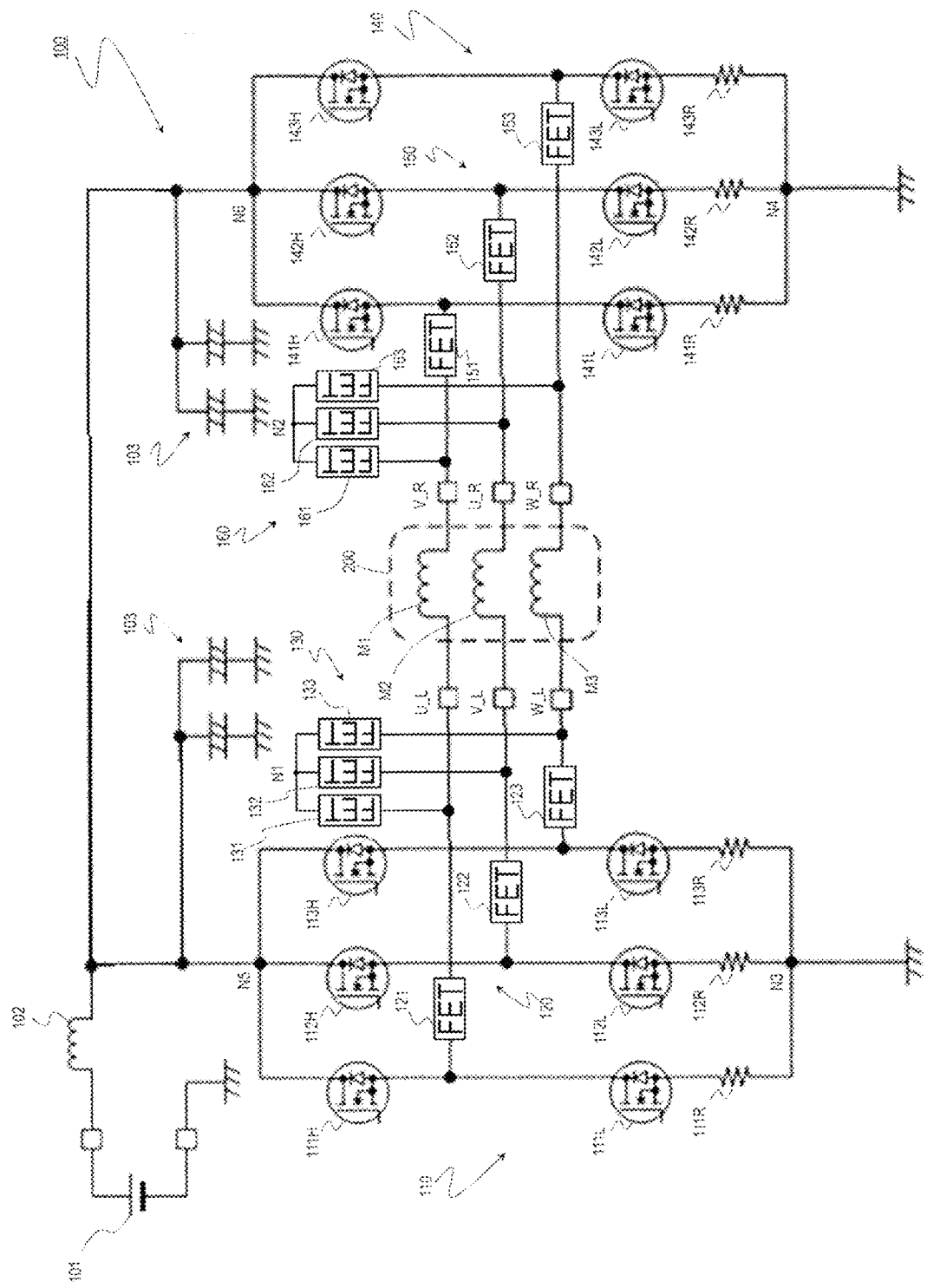
FIG. 1 is a circuit diagram illustrating a circuit configuration of a power conversion device 100 according to a first example embodiment of the present disclosure.

FIG. 1 schematically illustrates a circuit configuration of a power conversion device 100 according to the present example embodiment.

The power conversion device 100 includes a first inverter 110, a first phase separation relay circuit 120, a first neutral point relay circuit 130, a second inverter 140, a second phase separation relay circuit 150, and a second neutral point relay circuit 160. The power conversion device 100 can convert power supplied to various motors. A motor 200 is a three-phase alternating current (AC) motor. The motor 200 includes a U-phase winding M1, a V-phase winding M2, and a W-phase winding M3 and is connected to the first inverter 110 and the second inverter 140. Specifically, the first inverter 110 is connected to one ends of the windings of each phase of the motor 200, and the second inverter 140 is connected to the other ends of the windings of each phase. In the present specification, "connection" between components (elements) mainly means electrical connection.

The first inverter 110 has terminals U_L, V_L, and W_L corresponding to each phase, and the second inverter 140 has terminals U_R, V_R, and W_R corresponding to each phase. The terminal U_L of the first inverter 110 is connected to one end of the U-phase winding M1, the terminal V_L is connected to one end of the V-phase winding M2, and the terminal W_L is connected to one end of the W-phase winding M3. Like the first inverter 110, the terminal U_R of the second inverter 140 is connected to the other end of the U-phase winding M1, the terminal V_R is connected to the other end of the V-phase winding M2, and the terminal W_R is connected to the other end of the W-phase winding M3. Such connections are different from so-called star connections and delta connections.

The first inverter 110 (referred to as "bridge circuit L" in some cases) includes a bridge circuit formed of three legs. Each leg has a low side switching element and a high side switching element. Switching elements 111L, 112L, and 113L illustrated in FIG. 1 are low side switching elements, and switching elements 111H, 112H, and 113H illustrated in FIG. 1 are high side switching elements. As the switching element, for example, a field-effect transistor (typically, a metal-oxide semiconductor field-effect transistor (MOSFET)) or an insulated gate bipolar transistor (IGBT) may be used. In the present specification, an example in which an FET is used as a switching element of an inverter will be described, and in the following description, a switching element may be referred to as an FET in some cases. For example, the switching element 111L may also be referred to as "FET 111L."

The first inverter 110 includes three shunt resistors 111R, 112R, and 113R as current sensors (see FIG. 4) for detecting current flowing through each of the U-phase, V-phase, and W-phase windings. A current sensor 170 includes a current detection circuit (not illustrated) that detects current flowing through each shunt resistor. For example, the shunt resistors 111R, 112R, and 113R are respectively connected between the three low side switching elements included in the three legs of the first inverter 110 and the ground. Specifically, the shunt resistor 111R is connected between the FET 111L and the GND, the shunt resistor 112R is connected between the FET 112L and the GND, and the shunt resistor 113R is connected between the FET 113L and the GND. A resistance value of the shunt resistor is, for example, about 0.5 mΩ to 1.0 mΩ.

Like the first inverter 110, the second inverter 140 (referred to as "bridge circuit R" in some cases) includes a bridge circuit formed of three legs. FETs 141L, 142L, and 143L illustrated in FIG. 1 are low side switching elements, and FETs 141H, 142H, and 143H illustrated in FIG. 1 are high side switching elements. Also, the second inverter 140 includes three shunt resistors 141R, 142R, and 143R. The shunt resistors are connected between the three low side switching elements included in the three legs and the ground. Each FET of the first and second inverters 110 and 140 may be controlled by, for example, a microcontroller or a dedicated driver.

The first phase separation relay circuit 120 is connected between the one ends of the windings of each phase and the first inverter 110. Specifically, the first phase separation relay circuit 120 includes three first phase separation relays 121, 122, and 123 connected to the one ends of the windings of each phase and the first inverter 110. The first phase separation relay 121 is connected between a connection node of the FETs 111H and 111L and the one end of the U-phase winding M1. The first phase separation relay 122 is connected between a connection node of the FETs 112H and 112L and the one end of the V-phase winding M2. The first phase separation relay 123 is connected between a connection node of the FETs 113H and 113L and the one end of the W-phase winding M3. Due to this circuit configuration, the first phase separation relay circuit 120 switches between connection and disconnection between the one ends of the windings of each phase and the first inverter 110.

The second phase separation relay circuit 150 is connected between the other ends of the windings of each phase and the second inverter 140. Specifically, the second phase separation relay circuit 150 includes three second phase separation relays 151, 152, and 153 connected to the other ends of the windings of each phase and the second inverter 140. The second phase separation relay 151 is connected between a connection node of the FETs 141H and 141L and the other end of the U-phase winding M1. The second phase separation relay 152 is connected between a connection node of the FETs 142H and 142L and the other end of the V-phase winding M2. The second phase separation relay 153 is connected between a connection node of the FETs 143H and 143L and the other end of the W-phase winding M3. Due to this circuit configuration, the second phase separation relay circuit 150 switches between connection and disconnection between the other ends of the windings of each phase and the second inverter 140.

The first neutral point relay circuit 130 is connected to the one ends of the windings of each phase. The first neutral point relay circuit 130 includes three first neutral point relays 131, 132, and 133 whose respective one ends are connected to a common first node N1 and whose respective other ends are connected to the one ends of the windings of each phase. Specifically, the one end of the first neutral point relay 131 is connected to the first node N1, and the other end thereof is connected to the one end of the U-phase winding M1. The one end of the first neutral point relay 132 is connected to the first node N1, and the other end thereof is connected to the one end of the V-phase winding M2. The one end of the first neutral point relay 133 is connected to the first node N1, and the other end thereof is connected to the one end of the W-phase winding M3. Due to this circuit configuration, the first neutral point relay circuit 130 switches between connection and disconnection between the one ends of the windings of each phase.

The second neutral point relay circuit 160 is connected to the other ends of the windings of each phase. The second neutral point relay circuit 160 includes three second neutral point relays 161, 162, and 163 whose respective one ends are connected to a common second node N2, and whose respective other ends are connected to the other ends of the windings of each phase. Specifically, the one end of the second neutral point relay 161 is connected to the second node N2, and the other end thereof is connected to the other end of the U-phase winding M1. The one end of the second neutral point relay 162 is connected to the second node N2, and the other end thereof is connected to the other end of the V-phase winding M2. The one end of the second neutral point relay 163 is connected to the second node N2, and the other end thereof is connected to the other end of the W-phase winding M3. Due to this circuit configuration, the second neutral point relay circuit 160 switches between connection and disconnection between the other ends of the windings of each phase.

The on and off of the first phase separation relays 121, 122, and 123, the first neutral point relays 131, 132, and 133, the second phase separation relays 151, 152, and 153, and the second neutral point relays 161, 162, and 163 may be controlled by, for example, a microcontroller or a dedicated driver. As the relays, for example, transistors such as FETs or IGBTs may be widely used. Mechanical relays may also be used as the relays. In the present specification, an example in which FETs having a freewheeling diode are used as the relays will be described, and in the following description, each relay will be referred to as "FET." For example, the first phase separation relays 121, 122, and 123 are respectively referred to as FETs 121, 122, and 123.

Figure 12A:
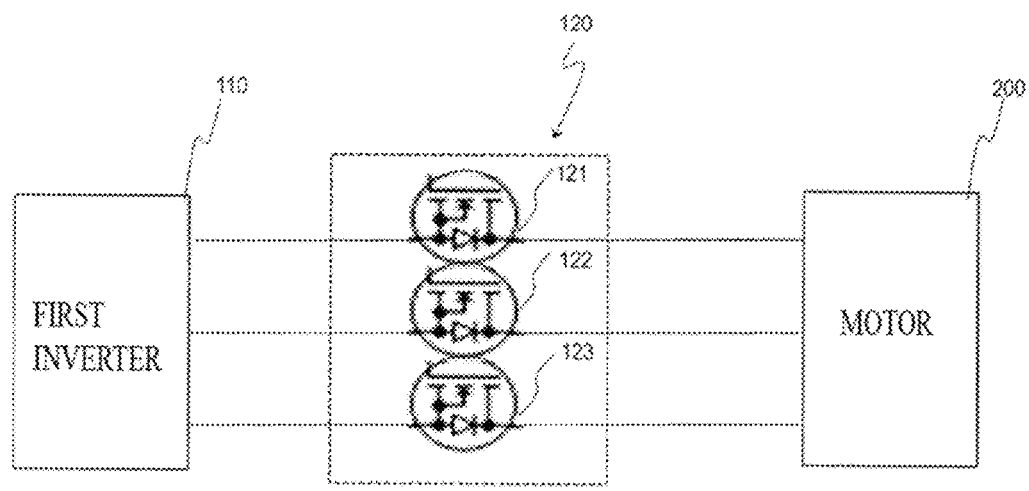
FIG. 12A is a schematic diagram illustrating a state in which each field-effect transistor (FET) is arranged in a first phase separation relay circuit 120.
Figure 12B:
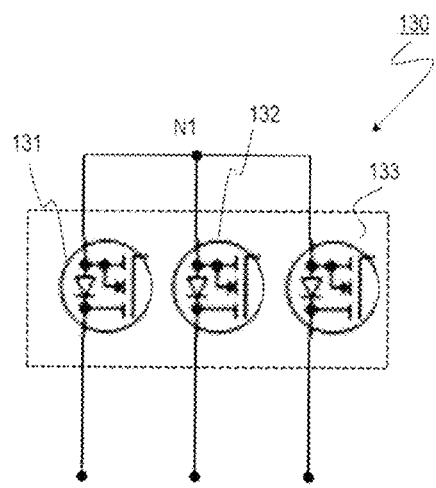
FIG. 12B is a schematic diagram illustrating a state in which each FET is arranged in a first neutral point relay circuit 130.

FIG. 12A schematically illustrates a state in which each FET is arranged in the first phase separation relay circuit 120. FIG. 12B schematically illustrates a state in which each FET is arranged in the first neutral point relay circuit 130.

In the first phase separation relay circuit 120, the three FETs 121, 122, and 123 are arranged such that freewheeling diodes are directed in the same direction, and a forward current flows in the freewheeling diodes toward the motor 200. In the first neutral point relay circuit 130, the three FETs 131, 132, and 133 are arranged such that freewheeling diodes are directed in the same direction, and a forward current flows in the freewheeling diodes toward the motor 200. Likewise, in the second phase separation relay circuit 150, the three FETs 151, 152, and 153 are arranged such that freewheeling diodes are directed in the same direction, and a forward current flows in the freewheeling diodes toward the motor 200. In the second neutral point relay circuit 160, the three FETs 161, 162, and 163 are arranged such that freewheeling diodes are directed in the same direction, and a forward current flows in the freewheeling diodes toward the motor 200. According to such an arrangement, a current flowing to the phase separation relay circuit and the neutral point relay circuit which are in the off state can be interrupted.

The power conversion device 100 is connected to a power supply 101 and the GND. Specifically, each of the first and second inverters 110 and 140 is connected to the power supply 101 and the GND. Power is supplied to the first and second inverters 110 and 140 from the power supply 101.

The power supply 101 generates a predetermined source voltage. As the power supply 101, for example, a direct current (DC) power supply is used. However, the power supply 101 may also be an AC-DC converter, a DC-DC converter, or a battery (storage battery). The power supply 101 may be a single power supply common to the first and second inverters 110 and 140 or may include a first power supply for the first inverter 110 and a second power supply for the second inverter 140.

A coil 102 is provided between the power supply 101 and the power conversion device 100. The coil 102 functions as a noise filter and smoothes high frequency noise included in a waveform of voltage supplied to each inverter or high frequency noise generated in each inverter so that the high frequency noise does not flow out to the power supply 101 side. Also, a condenser 103 is connected to a power supply terminal of each inverter. The condenser 103 is a so-called bypass condenser which suppresses voltage ripple. The condenser 103 is, for example, an electrolytic condenser, and the capacity and number of condensers used are appropriately determined according to design specifications and the like.

FIG. 1 illustrates a configuration in which a single shunt resistor is arranged in each leg of each inverter. However, the first and second inverters 110 and 140 may include six or less shunt resistors. The six or less shunt resistors may be connected between six or less low side switching elements of six legs of the first and second inverters 110 and 140 and the GND. Further extending this to an n-phase motor, the first and second inverters 110 and 140 may include 2n or less shunt resistors. The 2n or less shunt resistors may be connected between 2n or less low side switching elements of 2n legs of the first and second inverters 110 and 140 and the GND.

Figure 2:
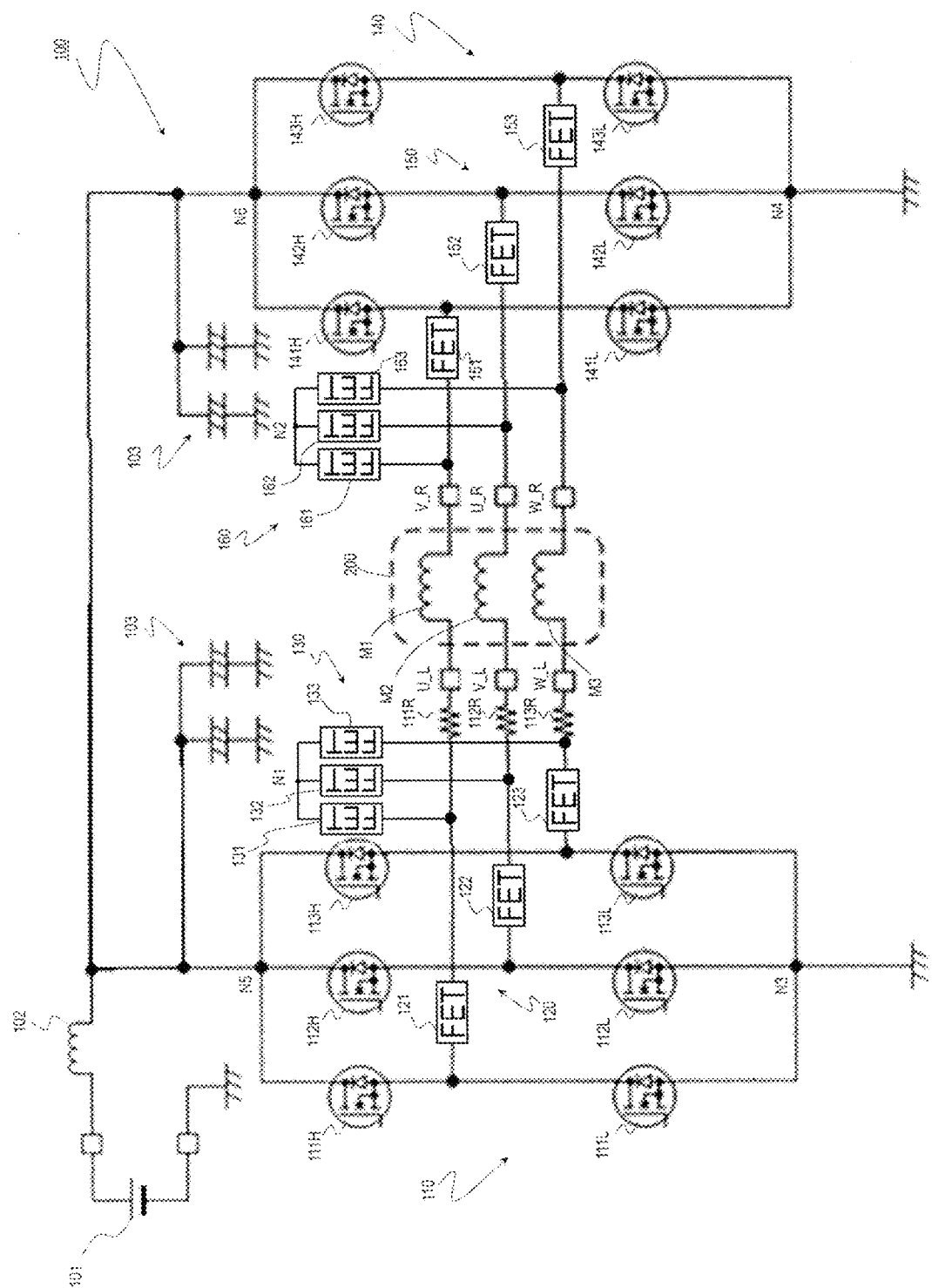
FIG. 2 is a circuit diagram illustrating another circuit configuration of the power conversion device 100 according to the first example embodiment of the present disclosure.

FIG. 2 schematically illustrates another circuit configuration of the power conversion device 100 according to the present example embodiment. It is also possible to arrange three shunt resistors between each leg of the first inverter 110 or the second inverter 140 and the windings M1, M2, and M3. For example, the shunt resistors 111R, 112R, and 113R may be arranged between the first inverter 110 and the one ends of the windings M1, M2, and M3. Also, for example, although not illustrated, the shunt resistors 111R and 112R may be arranged between the first inverter 110 and the one ends of the windings M1 and M2, and the shunt resistor 143R may be arranged between the second inverter 140 and the other end of the winding M3. In such a configuration, it is sufficient if three shunt resistors are arranged for the U, V, and W phases, and at least two shunt resistors may be arranged.

Figure 3:
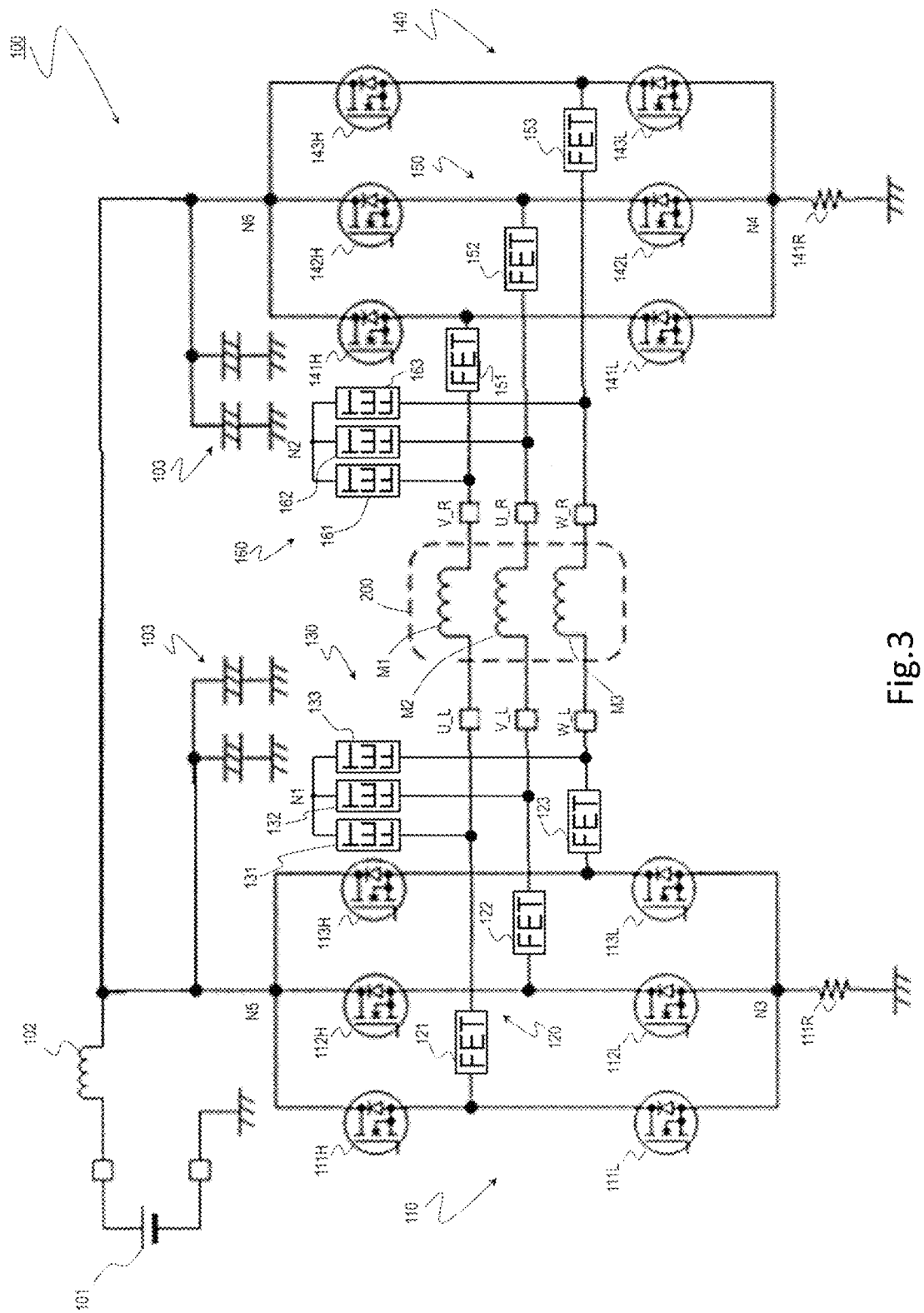
FIG. 3 is a circuit diagram illustrating still another circuit configuration of the power conversion device 100 according to the first example embodiment of the present disclosure.

FIG. 3 schematically illustrates still another circuit configuration of the power conversion device 100 according to the present example embodiment. For example, in each inverter, only one shunt resistor common to the windings of each phase may be arranged. One single shunt resistor 111R may be connected, for example, between a node N3 (connection point of each leg) on the low side of the first inverter 110 and the GND, and another single shunt resistor 141R may be connected, for example, between a node N4 on the low side of the second inverter 140 and the GND. Further, a motor current is detected using a shunt resistor on the normal inverter side. For that reason, the shunt resistor can be arranged at a position where the motor current can be detected regardless of the arrangement of the phase separation relay circuit. Alternatively, like the low side, one single shunt resistor 111R may be connected, for example, between a node N5 on the high side of the first inverter 110 and the power supply 101, and another single shunt resistor 141R may be connected, for example, between a node N6 on the high side of the second inverter 140 and the power supply 101. In this manner, the number of shunt resistors used and the arrangement of the shunt resistors are appropriately determined in consideration of product cost, design specifications, or the like.

Figure 4:
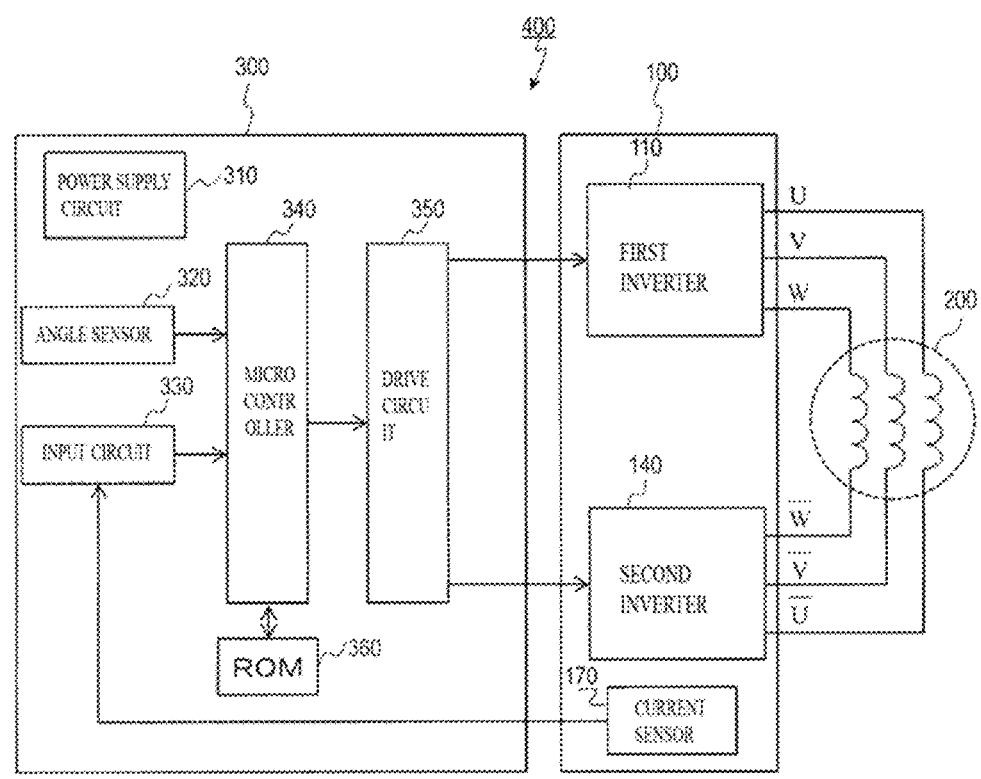
FIG. 4 is a block diagram illustrating a typical block configuration of a motor drive unit 400 including the power conversion device 100 according to the first example embodiment of the present disclosure.

FIG. 4 schematically illustrates a typical block configuration of a motor drive unit 400 including the power conversion device 100.

The motor drive unit 400 includes the power conversion device 100, the motor 200, and a control circuit 300.

The control circuit 300 includes, for example, a power supply circuit 310, an angle sensor 320, an input circuit 330, a microcontroller 340, a drive circuit 350, and a read only memory (ROM) 360. The control circuit 300 is connected to the power conversion device 100 and controls the power conversion device 100, thereby driving the motor 200. Specifically, the control circuit 300 can realize closed loop control by controlling the target motor torque or the target rotational speed.

The power supply circuit 310 generates DC voltages (for example, 3 V, 5 V) necessary for each block in the circuit. The angle sensor 320 is, for example, a resolver or a Hall integrated circuit (IC). The angle sensor 320 detects an angle of rotation (hereinafter referred to as "rotation signal") of a rotor of the motor 200 and outputs a rotation signal to the microcontroller 340. The input circuit 330 receives a motor current value (hereinafter referred to as "actual current value") detected by the current sensor 170, converts a level of the actual current value to an input level of the microcontroller 340 as necessary, and outputs the actual current value to the microcontroller 340.

The microcontroller 340 controls a switching operation (turning-on or turning-off) of each FET in first and second inverters 110 and 140 of the power conversion device 100. The microcontroller 340 sets a target current value according to the actual current value, the rotation signal of the rotor, and the like to generate a pulse width modulation (PWM) signal and outputs the PWM signal to the drive circuit 350. Also, for example, the microcontroller 340 may switch on/off states of the first phase separation relay circuit 120, the first neutral point relay circuit 130, the second phase separation relay circuit 150, and the second neutral point relay circuit 160 in the power conversion device 100. Alternatively, the drive circuit 350 may perform the switching of the on/off states of each relay circuit under control of the microcontroller 340. The drive circuit 350 is typically a gate driver. The drive circuit 350 generates, according to the PWM signal, a control signal (gate control signal) for controlling the switching operation of each FET in the first and second inverters 110 and 140 and assigns the control signal to a gate of each FET. Further, the microcontroller 340 may have a function of the drive circuit 350. In that case, the drive circuit 350 may not be present in the control circuit 300.

The ROM 360 is, for example, a writable memory, a rewritable memory, or a read-only memory. The ROM 360 stores a control program including an instruction group for causing the microcontroller 340 to control the power conversion device 100. For example, the control program is deployed temporarily into a random access memory (RAM) (not illustrated) at boot time.

The power conversion device 100 has control at a normal time and an abnormal time. The control circuit 300 (mainly the microcontroller 340) can switch control of the power conversion device 100 from control at the normal time to control at the abnormal time. The on/off states of the first phase separation relay circuit 120, the first neutral point relay circuit 130, the second phase separation relay circuit 150, and the second neutral point relay circuit 160 are determined according to the type of control.

Hereinafter, the on/off states of each relay circuit and the electrical connection relationships between the first and second inverters 110 and 140 and the motor 200 will be described in detail.

The control circuit 300 selectively controls both the first phase separation relay circuit 120 and the first neutral point relay circuit 130 so that, when the first phase separation relay circuit 120 is turned on, the first neutral point relay circuit 130 is turned off, and when the first phase separation relay circuit 120 is turned off, the first neutral point relay circuit 130 is turned on. Here, "turn on the first phase separation relay circuit 120" means turning on all of the FETs 121, 122, and 123, and "turn off the first phase separation relay circuit 120" means turning off all of the FETs 121, 122, and 123. Also, "turn on the first neutral point relay circuit 130" means turning on all of the FETs 131, 132, and 133, and "turn off the first neutral point relay circuit 130" means turning off all of the FETs 131, 132, and 133.

When the first phase separation relay circuit 120 is turned on, the first inverter 110 is connected to the one ends of the windings of each phase, and when the first phase separation relay circuit 120 is turned off, the first inverter 110 is separated from the one ends of the windings of each phase. When the first neutral point relay circuit 130 is turned on, the one ends of the windings of each phase are connected to each other, and when the first neutral point relay circuit 130 is turned off, the one ends of the windings of each phase are disconnected from each other.

The control circuit 300 selectively controls both the second phase separation relay circuit 150 and the second neutral point relay circuit 160 so that, when the second phase separation relay circuit 150 is turned on, the second neutral point relay circuit 160 is turned off, and when the second phase separation relay circuit 150 is turned off, the second neutral point relay circuit 160 is turned on. Here, "turn on the second phase separation relay circuit 150" means turning on all of the FETs 151, 152, and 153, and "turn off the second phase separation relay circuit 150" means turning off all of the FETs 151, 152, and 153. Also, "turn on the second neutral point relay circuit 160" means turning on all of the FETs 161, 162, and 163, and "turn off the second neutral point relay circuit 160" means turning off all of the FETs 161, 162, and 163.

When the second phase separation relay circuit 150 is turned on, the second inverter 140 is connected to the other ends of the windings of each phase, and when the second phase separation relay circuit 150 is turned off, the second inverter 140 is separated from the other ends of the windings of each phase. When the second neutral point relay circuit 160 is turned on, the other ends of the windings of each phase are connected to each other, and when the second neutral point relay circuit 160 is turned off, the other ends of the windings of each phase are disconnected from each other.

(1. Control at Normal Time)

First, a specific example of a control method at a normal time of the power conversion device 100 will be described. As described above, "normal" indicates the state in which a failure does not occur in each FET of the first and second inverters 110 and 140.

At the normal time, the control circuit 300 turns on the first phase separation relay circuit 120, turns off the first neutral point relay circuit 130, turns on the second phase separation relay circuit 150, and turns off the second neutral point relay circuit 160. Consequently, the first and second neutral point relay circuits 130 and 160 are separated from the windings of each phase, the first inverter 110 is connected to the one ends of the windings of each phase via the first phase separation relay circuit 120, and the second inverter 140 is connected to the other ends of the windings of each phase via the second phase separation relay circuit 150. In this connection state, the control circuit 300 uses both the first and second inverters 110 and 140 to perform three-phase energization control, thereby driving the motor 200. Specifically, the control circuit 300 performs the three-phase energization control by switching control of the FETs of the first inverter 110 and the FETs of the second inverter 140 in opposite phases (phase)difference=180° from each other. For example, focusing on an H-bridge including the FETs 111L, 111H, 141L, and 141H, when the FET 111L is turned on, the FET 141L is turned off, and when the FET 111L is turned off, the FET 141L is turned on. Likewise, when the FET 111H is turned on, the FET 141H is turned off, and when the FET 111H is turned off, the FET 141H is turned on.

Figure 5:
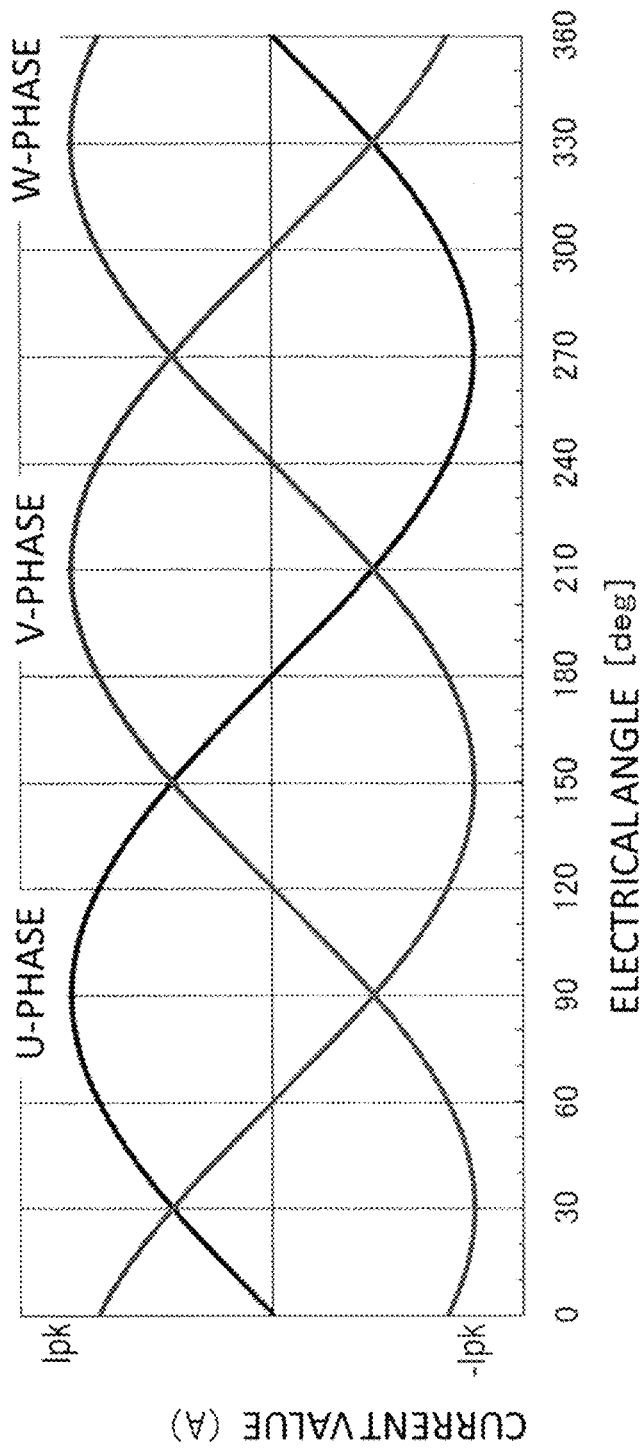
FIG. 5 is a view illustrating a current waveform (a sine wave) obtained by plotting values of currents flowing through each of U-phase, V-phase, and W-phase windings of a motor 200 when the power conversion device 100 is controlled according to three-phase energization control at a normal time.

FIG. 5 shows an example of a current waveform (sine wave) obtained by plotting values of current flowing through the U-phase, V-phase, and W-phase windings of the motor 200 when the power conversion device 100 is controlled according to the three-phase energization control at the normal time. The horizontal axis indicates the motor electrical angle (deg), and the vertical axis indicates the current value (A). In the current waveform of FIG. 5, current values are plotted every electrical angle of 30°. Ipk indicates the maximum current value (peak current value) of each phase. Further, in addition to the sine wave shown as an example in FIG. 5, it is possible to drive the motor 200 using, for example, a rectangular wave.

Table 1 shows values of current flowing to the terminals of each inverter for each electrical angle in the sine wave of FIG. 5. Specifically, Table 1 shows values of current per every electrical angle of 30° flowing to the terminals U_L, V_L, and W_L of the first inverter 110 (bridge circuit L) and values of current per every electrical angle 30° flowing to the terminals U_R, V_R, and W_R of the second inverter 140 (bridge circuit R). Here, for the bridge circuit L, a direction of current flowing from the terminals of the bridge circuit L to the terminals of the bridge circuit R is defined as a positive direction. The direction of current shown in FIG. 5 follows this definition. Also, for the bridge circuit R, a direction of current flowing from the terminals of the bridge circuit R to the terminals of the bridge circuit L is defined as a positive direction. Therefore, the phase difference between the current of the bridge circuit L and the current of the bridge circuit R is 180°. In Table 1, a magnitude of a current value I1 is $[(3)1/2/2]*Ipk$, and a magnitude of a current value I2 is $Ipk/2$.

magnitude Ipk flows from the bridge circuit R to the bridge circuit L in the W-phase winding M3.

At the electrical angle of 180°, no current flows through the U-phase winding M1. The current having the magnitude I1 flows from the bridge circuit L to the bridge circuit R in the V-phase winding M2, and the current having the magnitude I1 flows from the bridge circuit R to the bridge circuit L in the W-phase winding M3.

At the electrical angle of 210°, the current having the magnitude I2 flows from the bridge circuit R to the bridge

TABLE 1

| Operation at normal time | | 0 (360) | 30 | 60 | 90 | 120 | 150 | 180 | 210 | 240 | 270 | 300 | 330 |
|---|---|---|---|---|---|---|---|---|---|---|---|---|---|
| Bridge circuit L | U_L phase | 0 | $I_2$ | $I_1$ | $I_{pk}$ | $I_1$ | $I_2$ | 0 | $-I_2$ | $-I_1$ | $-I_{pk}$ | $-I_1$ | $-I_2$ |
| | V_L phase | $-I_1$ | $-I_{pk}$ | $-I_1$ | $-I_2$ | 0 | $I_2$ | $I_1$ | $I_{pk}$ | $I_1$ | $I_2$ | 0 | $-I_2$ |
| | W_L phase | $I_1$ | $I_2$ | 0 | $-I_2$ | $-I_1$ | $-I_{pk}$ | $-I_1$ | $-I_2$ | 0 | $I_2$ | $I_1$ | $I_{pk}$ |
| Bridge circuit R | U_R phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V_R phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W_R phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

At the electrical angle of 0°, no current flows through the U-phase winding M1. A current having a magnitude I1 flows from the bridge circuit R to the bridge circuit L in the V-phase winding M2, and the current having the magnitude I1 flows from the bridge circuit L to the bridge circuit R in the W-phase winding M3.

At the electrical angle of 30°, a current having a magnitude I2 flows from the bridge circuit L to the bridge circuit R in the U-phase winding M1, a current having a magnitude Ipk flows from the bridge circuit R to the bridge circuit L in the V-phase winding M2, and the current having the magnitude I2 flows from the bridge circuit L to the bridge circuit R in the W-phase winding M3.

At the electrical angle of 60°, the current having the magnitude I1 flows from the bridge circuit L to the bridge circuit R in the U-phase winding M1, and the current having the magnitude I1 flows from the bridge circuit R to the bridge circuit L in the V-phase winding M2. No current flows through the W-phase winding M3.

At the electrical angle of 90°, the current having the magnitude Ipk flows from the bridge circuit L to the bridge circuit R in the U-phase winding M1, the current having the magnitude I2 flows from the bridge circuit R to the bridge circuit L in the V-phase winding M2, and the current having the magnitude I2 flows from the bridge circuit R to the bridge circuit L in the W-phase winding M3.

At the electrical angle of 120°, the current having the magnitude I1 flows from the bridge circuit L to the bridge circuit R in the U-phase winding M1, and the current having the magnitude I1 flows from the bridge circuit L to the bridge circuit R in the W-phase winding M3. No current flows through the V-phase winding M2.

At the electrical angle of 150°, the current having the magnitude I2 flows from the bridge circuit L to the bridge circuit R in the U-phase winding M1, the current having the magnitude I2 flows bridge circuit L to the bridge circuit R in the V-phase winding M2, and the current having the circuit L in the U-phase winding M1, the current having the magnitude Ipk flows from the bridge circuit L to the bridge circuit R in the V-phase winding M2, and the current having the magnitude I2 flows from the bridge circuit R to the bridge circuit L in the W-phase winding M3.

At the electrical angle of 240°, the current having the magnitude I1 flows from the bridge circuit R to the bridge circuit L in the U-phase winding M1, and the current having the magnitude I1 flows from the bridge circuit L to the bridge circuit R in the V-phase winding M2. No current flows through the W-phase winding M3.

At the electrical angle of 270°, the current having the magnitude Ipk flows from the bridge circuit R to the bridge circuit L in the U-phase winding M1, the current having the magnitude I2 flows from the bridge circuit L to the bridge circuit R in the V-phase winding M2, and the current having the magnitude I2 flows from the bridge circuit L to the bridge circuit R in the W-phase winding M3.

At the electrical angle of 300°, the current having the magnitude I1 flows from the bridge circuit R to the bridge circuit L in the U-phase winding M1, and the current having the magnitude I1 flows from the bridge circuit L to the bridge circuit R in the W-phase winding M3. No current flows through the V-phase winding M2.

At the electrical angle of 330°, the current having the magnitude I2 flows from the bridge circuit R to the bridge circuit L in the U-phase winding M1, the current having the magnitude I2 flows from the bridge circuit R to the bridge circuit L in the V-phase winding M2, and the current having the magnitude Ipk flows from the bridge circuit L to the bridge circuit R in the W-phase winding M3.

According to the three-phase energization control according to the present example embodiment, the sum of the currents flowing through the three-phase windings in consideration of the direction of the current is always "0" for each electrical angle. For example, the control circuit 300 controls the switching operation of each FET of the bridge circuits L and R by PWM control such as obtaining the current waveform shown in FIG. 5.

A specific example of a control method at an abnormal time of the power conversion device 100 will be described. As described above, "abnormal" mainly indicates a state in which a failure has occurred in an FET. There are two major types of FET failure: "open failure" and "short failure." "Open failure" refers to a failure in which a portion between a source and a drain of an FET is open (in other words, resistance rds between the source and the drain becomes high impedance), and "short failure" refers to a failure in which the short circuit occurs between the source and the drain of the FET.

Referring back to FIG. 1, during the operation of the power conversion device 100, a random failure is usually considered to occur when one of the twelve FETs in the two inverters randomly fails. The present disclosure mainly provides a control method of the power conversion device 100 in the case in which a random failure occurs. However, the present disclosure also provides a control method of the power conversion device 100 in the case in which a plurality of FETs fail in a chain manner. A chain failure means, for example, a failure that occurs simultaneously in a high side switching element and a low side switching element of a single leg.

When the power conversion device 100 is used for a long time, a random failure may occur. Further, the random failure is different from a manufacture failure that may occur at the time of manufacturing. When even one of the plurality of FETs in the two inverters fails, the three-phase energization control at the normal time is no longer possible.

As an example of failure detection, the drive circuit 350 detects a failure of an FET by monitoring a voltage (Vds) between a drain and a source of the FET and comparing the Vds with a predetermined threshold voltage. The threshold voltage is set in the drive circuit 350, for example, by data communication with an external IC (not illustrated) and an external component. The drive circuit 350 is connected to a port of the microcontroller 340 and notifies the microcontroller 340 of a failure detection signal. For example, when the drive circuit 350 detects a failure of an FET, the drive circuit 350 asserts a failure detection signal. When the microcontroller 340 receives the asserted failure detection signal, the microcontroller 340 reads internal data of the drive circuit 350 to determine which of the plurality of FETs in the two inverters has failed.

As another example of failure detection, the microcontroller 340 can also detect a failure of an FET on the basis of a difference between an actual current value and a target current value of a motor. However, failure detection is not limited to these methods, and other known methods related to failure detection can be widely used.

When a failure detection signal is asserted, the microcontroller 340 switches the control of the power conversion device 100 from the control at the normal time to the control at the abnormal time. For example, a timing at which the control of the power conversion device 100 is switched from the control at the normal time to the control at the abnormal time is about 10 msec to 30 msec after the failure detection signal is asserted.

In the description of the control at the abnormal time, the first inverter 110 of the two inverters is treated as a failed inverter, and the second inverter 140 is treated as a normal inverter. Hereinafter, the control will be described separately for the case in which a failure occurs in a high side switching element and the case in which a failure occurs in a low side switching element.

It is assumed that, among the high side switching elements (FETs 111H, 112H, and 113H) of the first inverter 110, the FET 111H has an open failure. Further, even in the case in which the FET 112H or 113H has an open failure, the power conversion device 100 can be controlled by a control method which will be described below.

In the case in which the FET 111H has an open failure, the control circuit 300 turns off the first phase separation relay circuit 120, turns on the first neutral point relay circuit 130, turns on the second phase separation relay circuit 150, and turns off the second neutral point relay circuit 160. Consequently, the first inverter 110 including the failed FET 111H is separated from the motor 200 (that is, the one ends of the windings of each phase), and only the second inverter 140, which is normal, is connected to the motor 200 (that is, the other ends of the windings of each phase). In this connection state, by turning on the first neutral point relay circuit 130, the first node N1 functions as a neutral point of the windings of each phase. In the present specification, the aspect that a certain node functions as a neutral point is expressed as "a neutral point is configured." Further, a neutral point is not configured in the second neutral point relay circuit 160. In the first inverter 110, it is desirable that all of the FETs 112H, 113H, 111L, 112L, and 113L other than the failed FET111H be in the off state. For example, in the first inverter 110, the control circuit 300 may cause all the FETs 112H, 113H, 111L, 112L, and 113L other than the failed FET 111H to be in the off state. The control circuit 300 drives the motor 200 by controlling the second inverter 140 in a state in which a neutral point is configured in the first neutral point relay circuit 130.

According to this control, because the first inverter 110 can be separated from the motor 200 by the first phase separation relay circuit 120 and a closed loop of drive current can be formed using the first neutral point relay circuit 130, appropriate current control becomes possible even at the abnormal time.

Figure 6:
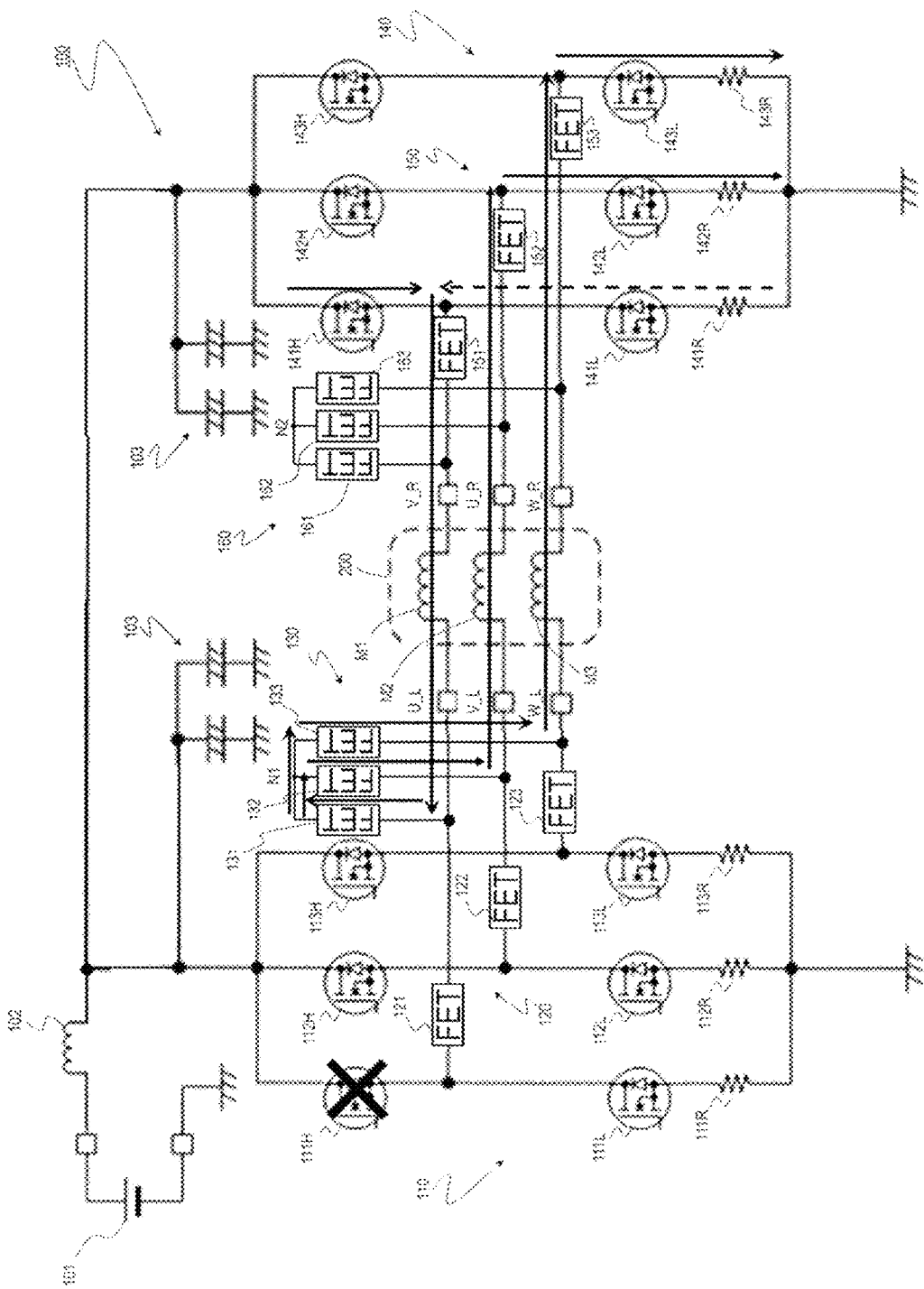
FIG. 6 is a schematic diagram illustrating the flow of current in the power conversion device 100 according to control at an abnormal time at, for example, a motor electrical angle of 270°.
Figure 7:
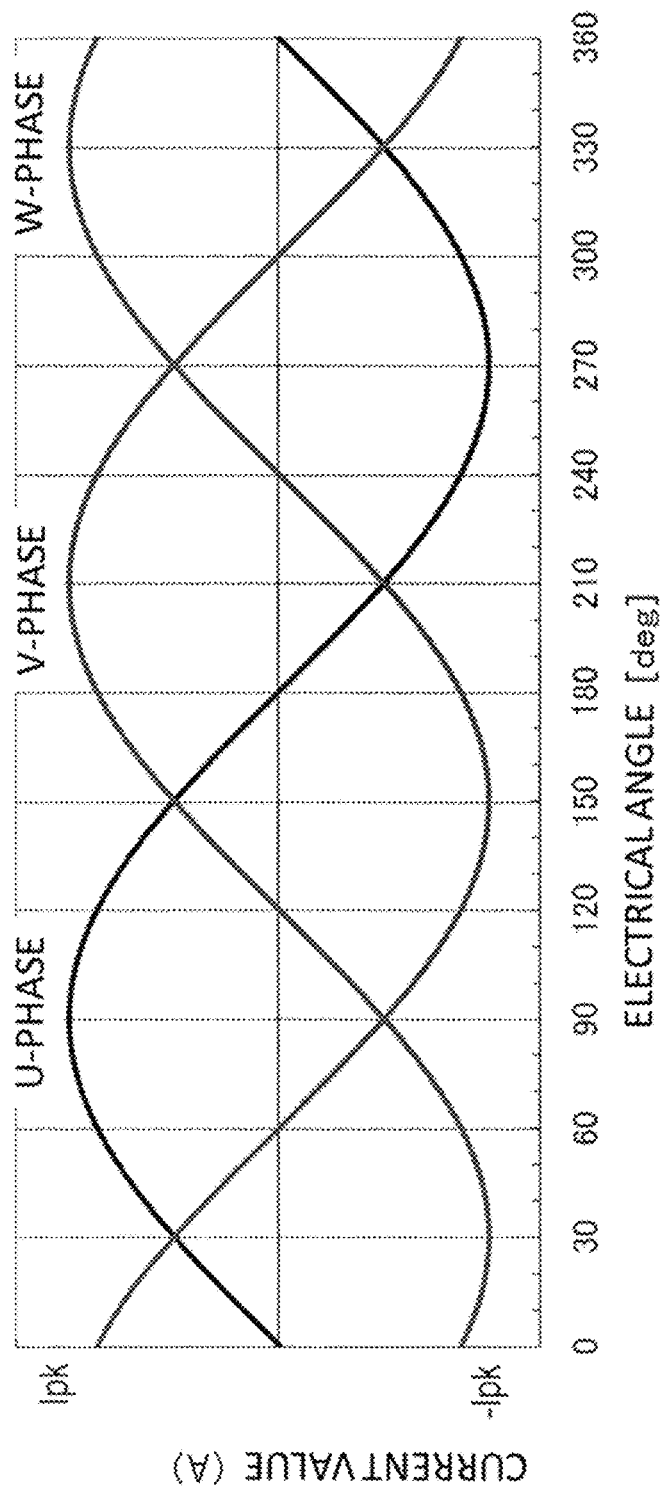
FIG. 7 is a view illustrating a current waveform obtained by plotting values of currents flowing through each of the U-phase, V-phase, and W-phase windings of the motor 200 according to the control at an abnormal time.

FIG. 6 schematically illustrates the flow of current in the power conversion device 100 according to control at an abnormal time at, for example, a motor electrical angle of 270°. Each of the three solid lines indicates a current flowing from the power supply 101 to the motor 200, and the broken line indicates a regenerative current returning to the winding M1 of the motor 200. FIG. 7 shows an example of a current waveform obtained by plotting values of current flowing through the U-phase, V-phase, and W-phase windings of the motor 200 according to the control at the abnormal time. The horizontal axis indicates the motor electrical angle (deg), and the vertical axis indicates the current value (A).

In the state shown in FIG. 6, the FETs 141H, 142L, and 143L of the second inverter 140 are in the on state, and the FETs 141L, 142H, and 143H thereof are in the off state. The current flowing through the FET 141H of the second inverter 140 flows to the neutral point through the winding M1 and the FET 131 of the first neutral point relay circuit 130. A portion of the current flows to the winding M2 through the FET 132, and the remaining current flows to the winding M3 through the FET 133. The currents flowing through the windings M2 and M3 flow to the GND through the FETs 142L and 143L of the second inverter 140, respectively. Also, a regenerative current flows toward the winding M1 of the motor 200 through a freewheeling diode of the FET 141L.

Because the FET 111H has an open failure and the FETs 112H, 113H, 111L, 112L, and 113 other than the FET 111H of the first inverter 110 are in the off state, no current flows from the power supply 101 to the first inverter 110. Also, because the first inverter 110 is separated from the motor 200 by the first phase separation relay circuit 120, no current flows from the second inverter 140 to the first inverter 110.

Table 2 shows values of current flowing to the terminals of the second inverter 140 for each electrical angle in the current waveform of FIG. 7. Specifically, Table 2 shows values of current per every electrical angle of 30° flowing to the terminals U_R, V_R, and W_R of the second inverter 140 (bridge circuit R). The definition of the direction of current is the same as that described above. Further, according to the definition of the direction of current, the positive and negative signs of the current values shown in FIG. 7 have a relationship opposite to those of the current values shown in Table 2 (phase difference of 180°).

TABLE 2

| Operation at abnormal time | | Electrical angle [deg] | | | | | | | | | | |
|---|---|---|---|---|---|---|---|---|---|---|---|---|
| | | 0 (360) | 30 | 60 | 90 | 120 | 150 | 180 | 210 | 240 | 270 | 300 | 330 |
| Bridge circuit R | U_R phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V_R phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W_R phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

For example, at the electrical angle of 30°, a current having a magnitude I2 flows from the bridge circuit L to the bridge circuit R in the U-phase winding M1, a current having a magnitude Ipk flows from the bridge circuit R to the bridge circuit L in the V-phase winding M2, and the current having the magnitude I2 flows from the bridge circuit L to the bridge circuit R in the W-phase winding M3. At the electrical angle of 60°, a current having a magnitude I1 flows from the bridge circuit L to the bridge circuit R in the U-phase winding M1, and the current having the magnitude I1 flows from the bridge circuit R to the bridge circuit L in the V-phase winding M2. No current flows through the W-phase winding M3. The sum of the current flowing into the neutral point and the current flowing out of the neutral point is always "0" for every electrical angle. For example, the control circuit 300 controls the switching operation of each FET of the bridge circuit R by PWM control such as obtaining the current waveform shown in FIG. 7.

As shown in Table 1 and Table 2, the motor current flowing to the motor 200 does not change for each electrical angle between the control at the normal time and the control at the abnormal time. For this reason, in the control at the abnormal time, the auxiliary torque of the motor in the control at the normal time is maintained.

Even in the case in which the FET 111H has a short failure, like the case in which the FET 11H has an open failure, the power conversion device 100 can be controlled according to the above-described control method. In the case of a short failure, because, although the FET 111H is always in the on state, the FET 121 of the first phase separation relay circuit 120 is in the off state, and the FETs 112H, 113H, 111L, 112L, and 113L other than the FET 111H are in the off state, no current flows from the power supply 101 to the first inverter 110.

It is assumed that, among the low side switching elements (FETs 111L, 112L, and 113L) of the first inverter 110, the FET 111L has an open failure or a short failure. The control in that case is similar to the control in the case in which a high side switching element fails. That is, the control circuit 300 turns off the first phase separation relay circuit 120, turns on the first neutral point relay circuit 130, turns on the second phase separation relay circuit 150, and turns off the second neutral point relay circuit 160. Further, in the first inverter 110, the control circuit 300 causes all the FETs 111H, 112H, 113H, 112L, and 113L other than the failed FET 111L to be in the off state. The control circuit 300 drives the motor 200 by controlling the second inverter 140 in a state in which a neutral point is configured in the first neutral point relay circuit 130.

In the case in which the FET 111L fails, because the FETs 111H, 112H, 113H, 112L, and 113L other than the FET 111L of the first inverter 110 are in the off state, no current flows from the power supply 101 to the first inverter 110. Also, because the first inverter 110 is separated from the motor 200 by the first phase separation relay circuit 120, no current flows from the second inverter 140 to the first inverter 110. Further, even in the case in which the FET 112L or 113L fails, the power conversion device 100 can be controlled using the above-described control method.

In this manner, in the case in which the first inverter 110 includes at least one failed FET, the first inverter 110 can be separated from the motor 200 using the first phase separation relay circuit 120, and it is possible to cause the first node N1 to function as the neutral point of the windings of each phase by the first neutral point relay circuit 130.

A modified example of the circuit configuration of the power conversion device 100 will be described with reference to FIG. 8.

In the present example embodiment, the power conversion device 100 includes the two phase separation relay circuits and the two neutral point relay circuits. However, the present disclosure is not limited thereto. For example, the power conversion device 100 may also include only the first phase separation relay circuit 120 and the first neutral point relay circuit 130 (a set of relay circuits). In other words, a configuration in which a set of relay circuits is provided in a single inverter of the power conversion device 100 may also be selected.

Figure 8:
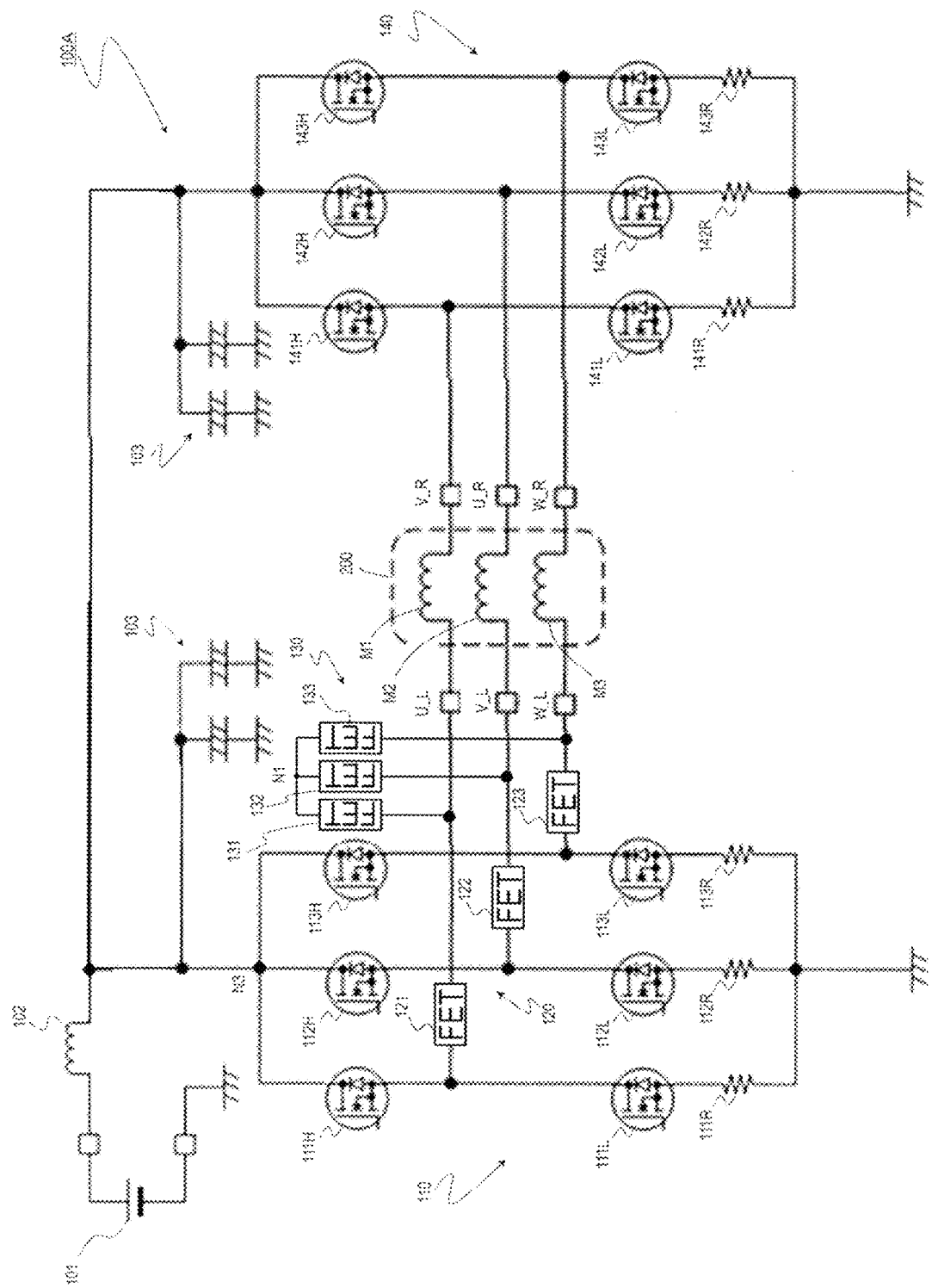
FIG. 8 is a circuit diagram illustrating a circuit configuration of a power conversion device 100A including a set of relay circuits.

FIG. 8 illustrates a circuit configuration of a power conversion device 100A including a set of relay circuits. It is assumed that an inverter connected to a set of relay circuits, that is, the first inverter 110 connected to the first phase separation relay circuit 120 and the first neutral point relay circuit 130, has failed. In that case, the control circuit 300 turns off the first phase separation relay circuit 120 and turns on the first neutral point relay circuit 130. According to this circuit configuration, the failed inverter can be separated from the motor 200, and it is possible to cause the first node N1 to function as a neutral point. The control circuit 300 can drive the motor 200 by controlling the second inverter 140, which is normal, in a state in which a neutral point is configured in the first neutral point relay circuit 130.

According to the present example embodiment, power loss can be suppressed in the control at the abnormal time, and by forming a closed loop of drive current, appropriate current control becomes possible.

Generally, vehicles such as automobiles include an electric power steering device. The electric power steering device generates auxiliary torque for assisting steering torque of a steering system that is generated by a driver operating a steering wheel. The auxiliary torque is generated by an auxiliary torque mechanism and can reduce the burden on an operation of the driver. For example, the auxiliary torque mechanism is configured by a steering torque sensor, an electronic control unit (ECU), a motor, a deceleration mechanism, and the like. The steering torque sensor detects steering torque in a steering system. The ECU generates a drive signal on the basis of a detection signal of the steering torque sensor. The motor generates auxiliary torque according to the steering torque on the basis of the drive signal and transmits the auxiliary torque to the steering system through the deceleration mechanism.

Figure 9:
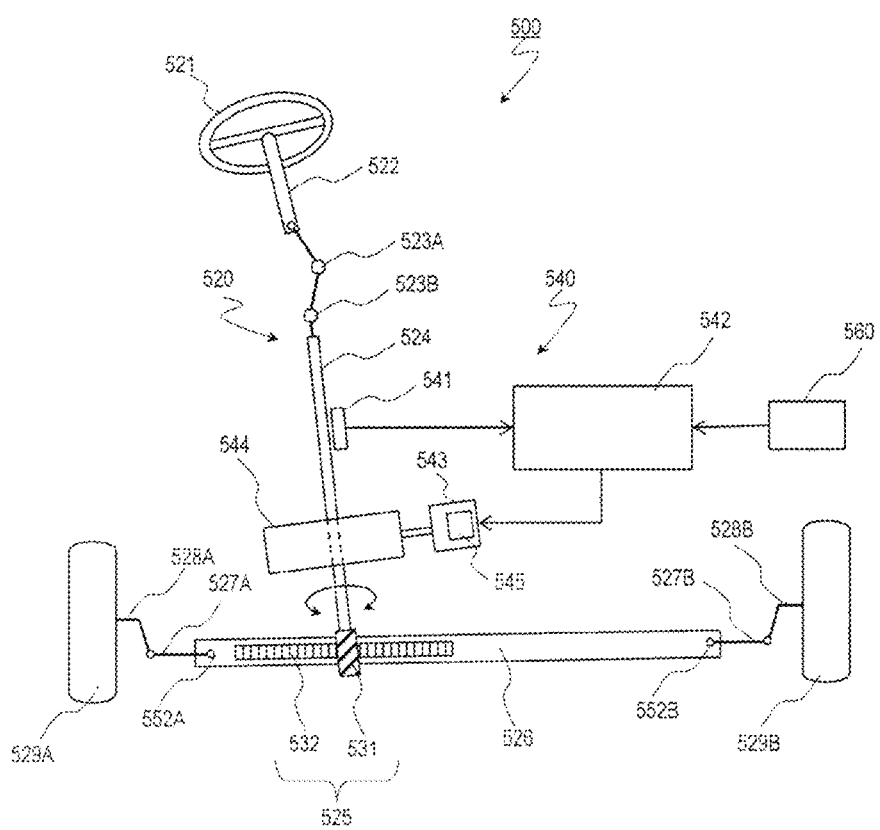
FIG. 9 is a schematic diagram illustrating a typical configuration of an electric power steering device 500 according to a second example embodiment of the present disclosure.

The motor drive unit 400 of the present disclosure is suitably used for an electric power steering device. FIG. 9 schematically illustrates a typical configuration of an electric power steering device 500 according to the present example embodiment. The electric power steering device 500 includes a steering system 520 and an auxiliary torque mechanism 540.

The steering system 520 may be configured by, for example, a steering wheel 521, a steering shaft 522 (also referred to as "steering column"), universal couplings 523A and 523B, a rotation shaft 524 (also referred to as "pinion shaft" or "input shaft"), a rack and pinion mechanism 525, a rack shaft 526, left and right ball joints 552A and 552B, tie rods 527A and 527B, knuckles 528A and 528B, and left and right steering vehicle wheels (for example, left and right front wheels) 529A and 529B. The steering wheel 521 is connected to the rotation shaft 524 through the steering shaft 522 and the universal couplings 523A and 523B. The rack shaft 526 is connected to the rotation shaft 524 through the rack and pinion mechanism 525. The rack and pinion mechanism 525 has a pinion 531 provided at the rotation shaft 524 and a rack 532 provided at the rack shaft 526. The steering vehicle wheel 529A at a right side is connected to a right end of the rack shaft 526 while the ball joint 552A, the tie rod 527A, and the knuckle 528A are interposed in that order therebetween. Like the right side, the steering vehicle wheel 529B at a left side is connected to a left end of the rack shaft 526 while the ball joint 552B, the tie rod 527B, and the knuckle 528B are interposed in that order therebetween. Here, the right side and the left side respectively correspond to a right side and a left side as seen by the driver sitting on the driver's seat.

According to the steering system 520, by the driver operating the steering wheel 521, the auxiliary torque is generated and transmitted to the left and right steering vehicle wheels 529A and 529B through the rack and pinion mechanism 525. Consequently, the driver can operate the left and right steering vehicle wheels 529A and 529B.

The auxiliary torque mechanism 540 may be configured by, for example, a steering torque sensor 541, an ECU 542, a motor 543, a deceleration mechanism 544, and a power conversion device 545. The auxiliary torque mechanism 540 assigns auxiliary torque to the steering system 520 ranging from the steering wheel 521 to the left and right steering vehicle wheels 529A and 529B. Further, the auxiliary torque is referred to as "additional torque" in some cases.

The control circuit 300 according to the first example embodiment may be used as the ECU 542, and the power conversion device 100 according to the first example embodiment may be used as the power conversion device 545. Also, the motor 543 corresponds to the motor 200 according to the first example embodiment. The motor drive unit 400 according to the first example embodiment may be suitably used for a mechanically and electrically integrated unit that is capable of being configured by the ECU 542, the motor 543, and the power conversion device 545.

The steering torque sensor 541 detects the steering torque of the steering system 520 assigned by the steering wheel 521. The ECU 542 generates a drive signal for driving the motor 543 on the basis of a detection signal (hereinafter referred to as "torque signal") from the steering torque sensor 541. The motor 543 generates auxiliary torque according to the steering torque on the basis of the drive signal. The auxiliary torque is transmitted to the rotation shaft 524 of the steering system 520 through the deceleration mechanism 544. The deceleration mechanism 544 is, for example, a worm gear mechanism. The auxiliary torque is also transmitted from the rotation shaft 524 to the rack and pinion mechanism 525.

The electric power steering device 500 may be classified into a pinion assist type, a rack assist type, a column assist type, and the like by a site where the auxiliary torque is assigned to the steering system 520. FIG. 9 illustrates the electric power steering device 500 of the pinion assist type. However, the electric power steering device 500 may also be applied as the rack assist type, the column assist type, and the like.

Not only the torque signal but also, for example, a vehicle speed signal may be input to the ECU 542. An external device 560 is, for example, a vehicle speed sensor. Alternatively, the external device 560 may also be another ECU capable of communicating in an in-vehicle network such as a controller area network (CAN). A microcontroller of the ECU 542 can perform vector control or PWM control on the motor 543 on the basis of the torque signal, the vehicle speed signal, or the like.

The ECU 542 sets a target current value on the basis of at least the torque signal. It is desirable that the ECU 542 set the target current value by taking into consideration the vehicle speed signal detected by the vehicle speed sensor and a rotation signal of a rotor detected by an angle sensor. The ECU 542 may control a drive signal, that is, a drive current, of the motor 543 so that an actual current value detected by a current sensor (not illustrated) corresponds to the target current value.

According to the electric power steering device 500, the left and right steering vehicle wheels 529A and 529B can be operated by the rack shaft 526 using combined torque obtained by adding the auxiliary torque of the motor 543 to the steering torque of the driver. Particularly, by using the motor drive unit 400 of the present disclosure in the above-described mechanically and electrically integrated unit, there is provided an electric power steering device including a motor drive unit in which quality of components is improved and appropriate current control becomes possible at either of the normal time and abnormal time.

Figure 10:
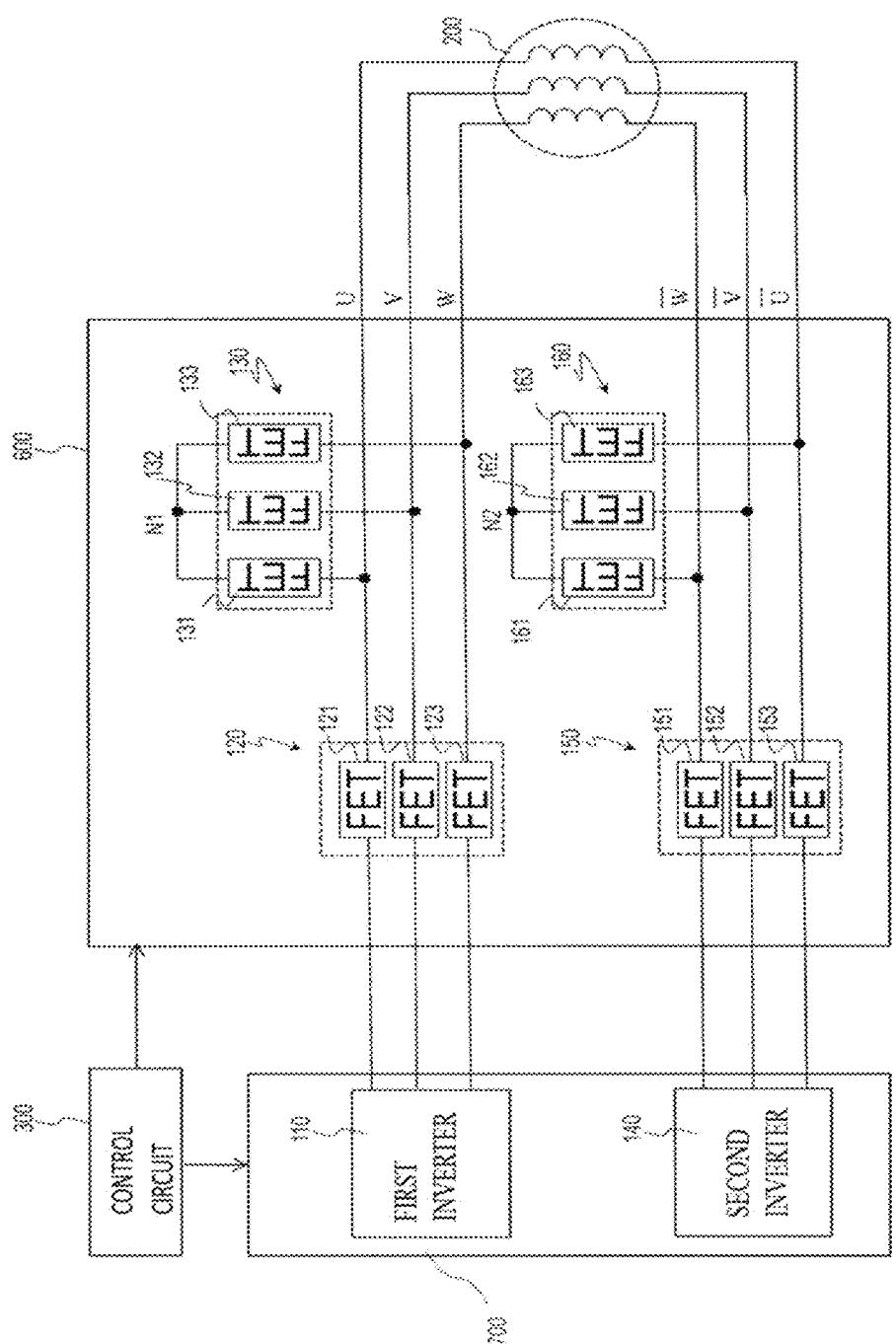
FIG. 10 is a circuit diagram illustrating a circuit configuration of a relay module 600 according to a third example embodiment of the present disclosure.

FIG. 10 schematically illustrates a circuit configuration of a relay module 600 according to the present example embodiment.

The relay module 600 includes a first phase separation relay circuit 120, a first neutral point relay circuit 130, a second phase separation relay circuit 150, and a second neutral point relay circuit 160. The relay module 600 drives a motor 200 having three-phase (U-phase, V-phase, W-phase) windings and can be connected to a power conversion device 700 including a first inverter 110 connected to one ends of the windings of each phase and a second inverter 140 connected to the other ends of the windings of each phase.

The relay module 600 is electrically connected between the motor 200 and the power conversion device 700. The structure of each of the first phase separation relay circuit 120, the first neutral point relay circuit 130, the second phase separation relay circuit 150, and the second neutral point relay circuit 160 is the same as that described above in the first example embodiment. That is, the first phase separation relay circuit 120 includes three FETs 121, 122, and 123 connected to the one ends of the windings of each phase and the first inverter 110, and the second phase separation relay circuit 150 includes three FETs 151, 152, and 153 connected to the other ends of the windings of each phase and the second inverter 140. The first neutral point relay circuit 130 includes three FETs 131, 132, and 133 whose respective one ends are connected to a common first node N1 and whose respective other ends are connected to the one ends of the windings of each phase. The second neutral point relay circuit 160 includes three FETs 161, 162, and 163 whose respective one ends are connected to a common second node N2, and whose respective other ends are connected to the other ends of the windings of each phase.

The first phase separation relay circuit 120 switches between connection and disconnection between the one ends of the windings of each phase and the first inverter 110, and the second phase separation relay circuit 150 switches between connection and disconnection between the other ends of the windings of each phase and the second inverter 140. The first neutral point relay circuit 130 switches between connection and disconnection between the one ends of the windings of each phase, and the second neutral point relay circuit 160 switches between connection and disconnection between the other ends of the windings of each phase.

In the relay module 600, when the first phase separation relay circuit 120 is turned on, the first neutral point relay circuit 130 is turned off, and when the first phase separation relay circuit 120 is turned off, the first neutral point relay circuit 130 is turned on. When the second phase separation relay circuit 150 is turned on, the second neutral point relay circuit 160 is turned off, and when the second phase separation relay circuit 150 is turned off, the second neutral point relay circuit 160 is turned on. The relay module 600, specifically, each relay circuit, may be controlled by, for example, an external control circuit or a dedicated driver. The external control circuit is, for example, the control circuit 300 according to the first example embodiment. In the present example embodiment, the relay module 600 is controlled by the control circuit 300.

At the normal time, the control circuit 300 turns on the first phase separation relay circuit 120, turns off the first neutral point relay circuit 130, turns on the second phase separation relay circuit 150, and turns off the second neutral point relay circuit 160. Further, the on/off states of each relay circuit and the electrical connection relationships between the first and second inverters 110 and 140 and the motor 200 are the same as those described above in the first example embodiment. For example, the control circuit 300 can drive a motor by controlling the switching operation of each FET of the two inverters by PWM control such as obtaining the current waveform shown in FIG. 5.

At the abnormal time, it is assumed that the first inverter 110 has failed. In that case, as in the first example embodiment, the control circuit 300 turns off the first phase separation relay circuit 120, turns on the first neutral point relay circuit 130, turns on the second phase separation relay circuit 150, and turns off the second neutral point relay circuit 160. In this state, due to the connection between the one ends of the windings of each phase of the motor 200, the neutral point of the windings of each phase is configured in the relay module 600 (specifically, the first neutral point relay circuit 130). The control circuit 300 can drive the motor 200 by controlling the second inverter 140 in a state in which the neutral point is configured. The control circuit 300 controls the switching operation of each FET of the second inverter 140 by PWM control such as obtaining the current waveform shown in FIG. 7. In this manner, because a closed loop of drive current can be formed using the relay module 600, appropriate current control becomes possible even at the abnormal time.

A modified example of the circuit configuration of the relay module 600 will be described with reference to FIG. 11.

In the present example embodiment, the relay module 600 includes two phase separation relay circuits and two neutral point relay circuits. However, the present disclosure is not limited thereto. For example, the relay module 600 may also include only the first phase separation relay circuit 120 and the first neutral point relay circuit 130 (a set of relay circuits). In other words, a configuration in which a set of relay circuits is provided in a single inverter of the power conversion device 100 may also be selected.

Figure 11:
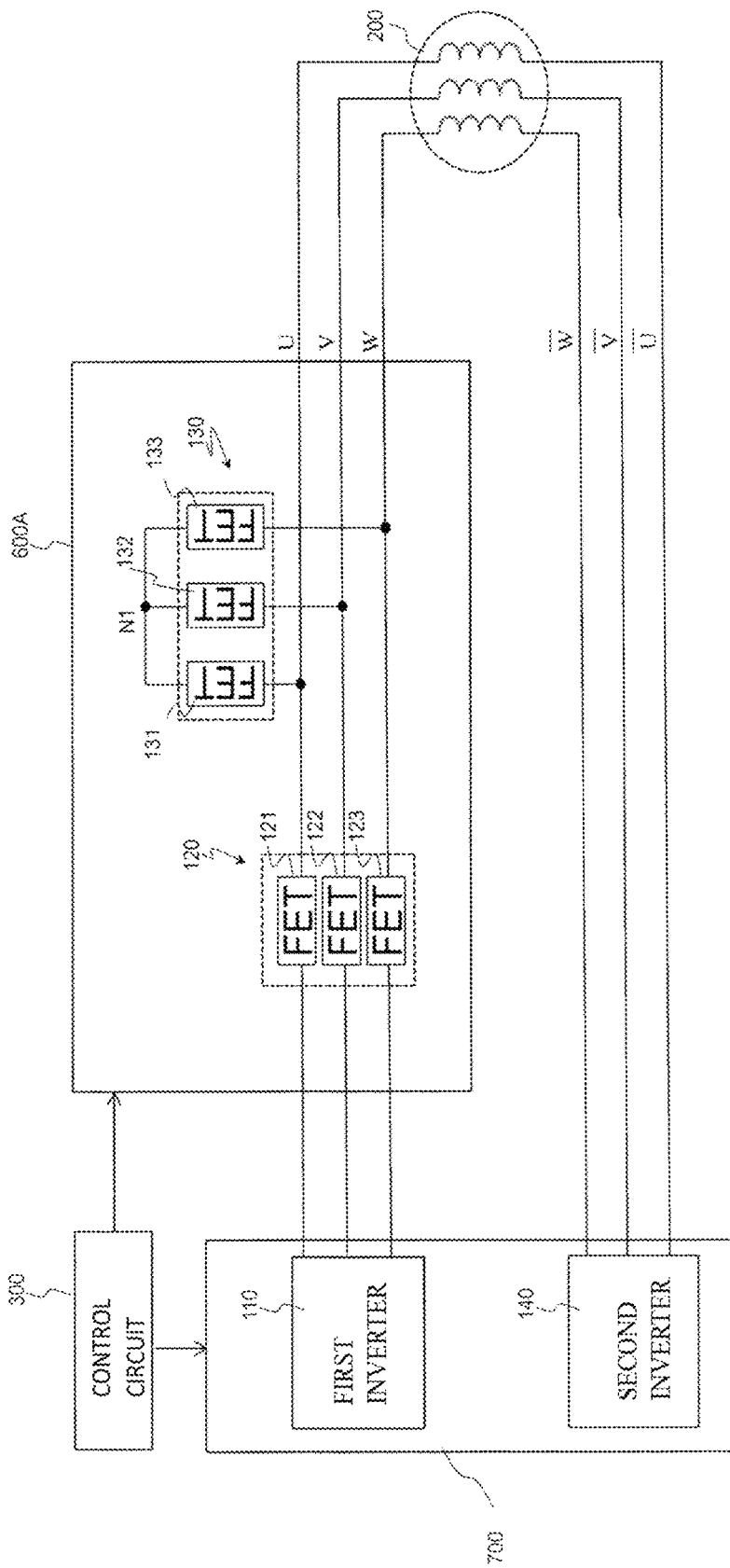
FIG. 11 is a circuit diagram illustrating a circuit configuration of a relay module 600A including a set of relay circuits.

FIG. 11 illustrates a circuit configuration of a relay module 600A including a set of relay circuits. The relay module 600A is connected between one of the first and second inverters 110 and 140 and the motor 200. In the illustrated example, the set of relay circuits (that is, the first phase separation relay circuit 120 and the first neutral point relay circuit 130) are connected to the first inverter 110.

It is assumed that the inverter connected to the set of relay circuits, that is, the first inverter 110, has failed. In that case, the control circuit 300 turns off the first phase separation relay circuit 120 and turns on the first neutral point relay circuit 130. The control circuit 300 can drive the motor 200 by controlling the second inverter 140 in the state in which the neutral point is configured. According to this circuit configuration, the failed inverter can be separated from the motor 200, and it is possible to cause the first node N1 to function as the neutral point.

According to the present example embodiment, power loss can be suppressed in the control at the abnormal time of the power conversion device 700, and by forming a closed loop of drive current, appropriate current control becomes possible.

A circuit configuration of a power conversion device 100B according to a fourth example embodiment and operations at a normal time and an abnormal time will be described with reference to FIGS. 13 to 16.

Figure 13:
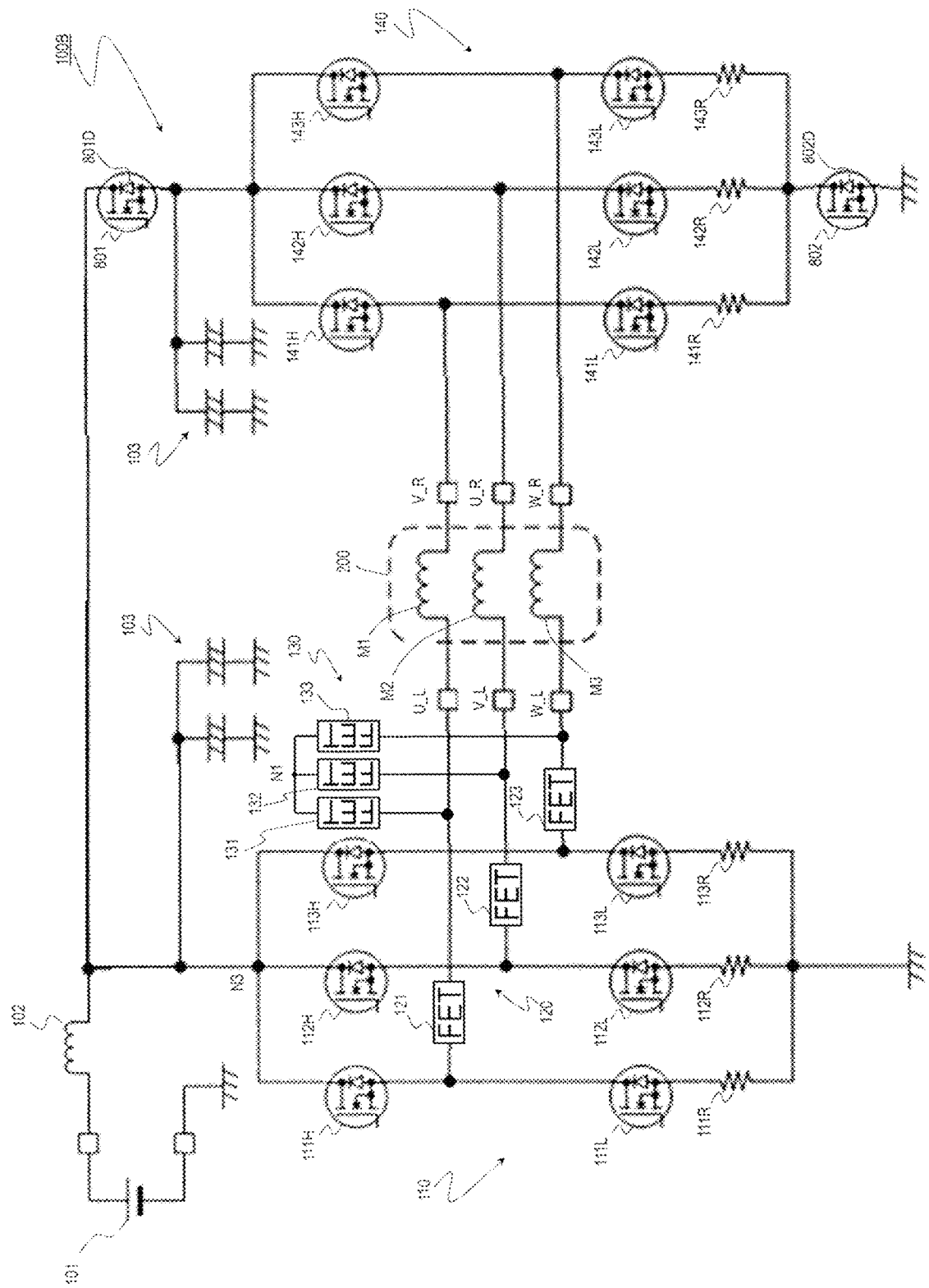
FIG. 13 is a circuit diagram illustrating a circuit configuration of a power conversion device 100B according to a fourth example embodiment of the present disclosure.

FIG. 13 schematically illustrates the circuit configuration of the power conversion device 100B.

The power conversion device 100B is different from the power conversion device 100A according to the first example embodiment in that the power conversion device 100B includes first and second switching elements 801 and 802. Hereinafter, differences from the first example embodiment will be mainly described.

The power conversion device 100B includes a set of relay circuits (a first phase separation relay circuit 120 and a first neutral point relay circuit 130) disposed at a first inverter 110 side and the first and second switching elements 801 and 802 which are disposed at a second inverter 140 side.

In the power conversion device 100B, the second inverter 140 can be connected to a power supply 101 and a GND by the two switching elements 801 and 802. Specifically, the first switching element 801 switches between connection and disconnection between the second inverter 140 and the power supply 101. The second switching element 802 switches between connection and disconnection between the second inverter 140 and the GND.

The on and off of the first and second switching elements 801 and 802 may be controlled by, for example, the microcontroller 340 (see FIG. 4) or a dedicated driver. As the first and second switching elements 801 and 802, for example, semiconductor switching elements such as MOSFETs or IGBTs may be widely used. However, a mechanical relay may also be used. In the present specification, an example in which semiconductor switching elements are used as the first and second switching elements 801 and 802 will be described, and the first and second switching elements 801 and 802 will be referred to as FETs 801 and 802, respectively.

The two switching elements 801 and 802 have freewheeling diodes 801D and 802D, respectively. The FET 801 is arranged such that the freewheeling diode 801D faces the power supply 101, and the FET 802 is arranged such that the freewheeling diode 802D faces the second inverter 140. More specifically, the FET 801 is arranged such that a forward current flows toward the power supply 101 in the freewheeling diode 801D, and the FET 802 is arranged such that a forward current flows toward the second inverter 140 in the freewheeling diode 802D.

The present example embodiment is not limited to the illustrated example, and the number of switching elements used is appropriately determined in consideration of design specifications and the like. Particularly, because high quality assurance is required from the viewpoint of safety in the in-vehicle field, it is desirable that a plurality of switching elements be provided in an interrupting switching element.

Figure 14:
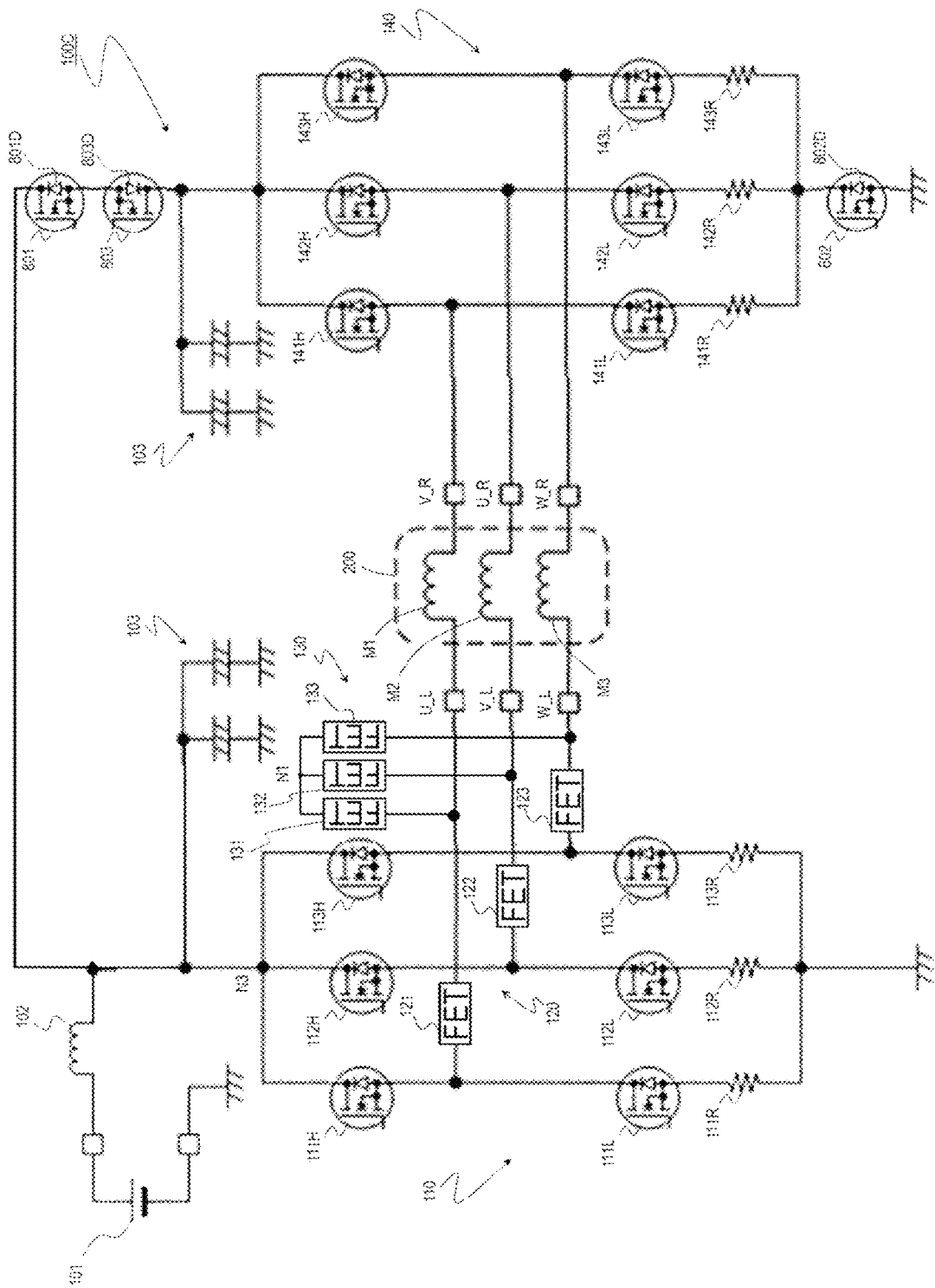
FIG. 14 is a circuit diagram illustrating a circuit configuration of a power conversion device 100C according to the fourth example embodiment of the present disclosure.

FIG. 14 schematically illustrates a circuit configuration of a power conversion device 100C according to a modified example of the present example embodiment.

The power conversion device 100C further includes a third switching element (FET) 803 for reverse connection protection that has a freewheeling diode 803D. At a power supply side of the second inverter 140, the FETs 801 and 803 are arranged such that directions of the freewheeling diodes in the FETs are opposite to each other. Specifically, the FET 801 is arranged such that a forward current flows toward the power supply 101 in the freewheeling diode 801D, and the FET 803 is arranged such that a forward current flows toward the second inverter 140 in the freewheeling diode 803D. According to such an arrangement, even in the case in which the power supply 101 is connected in a reverse direction, a reverse current can be interrupted by the FET 803 for reverse connection protection.

In the control at the normal time, the control circuit 300 turns on the first phase separation relay circuit 120, turns off the first neutral point relay circuit 130, and turns on the FETs 801 and 802. Consequently, the first neutral point relay circuit 130 is separated from the windings of each phase, and the first inverter 110 is connected to the one ends of the windings of each phase through the first phase separation relay circuit 120. The second inverter 140 is connected to the power supply 101 and the GND. In this connection state, as described above, the control circuit 300 can drive the motor 200 by performing the three-phase energization control using both the first and second inverters 110 and 140.

When the first inverter 110 has failed, the control circuit 300 turns off the first phase separation relay circuit 120, turns on the first neutral point relay circuit 130, and turns on the FETs 801 and 802. In this connection state, the failed inverter is separated from the motor 200, and it is possible to cause the first node N1 to function as the neutral point. The control circuit 300 can continue driving the motor 200 by controlling the second inverter 140, which is normal, in the state in which the neutral point is configured in the first neutral point relay circuit 130.

When the second inverter 140 has failed, the control circuit 300 turns on the first phase separation relay circuit 120, turns off the first neutral point relay circuit 130, and controls the on/off of the FETs 801 and 802 according to a failure pattern which will be described below.

In the case in which the three high side switching elements (FETs 141H, 142H, and 143H) in the second inverter 140 include a switching element having an open failure, in principle, the control circuit 300 turns off the FETs 801 and 802, turns off all the switching elements other than the failed switching element among the three high side switching elements, and turns on all of the three low side switching elements.

It is assumed that the FET 141H has failed among the three high side switching elements. Further, even in the case in which the FET 142H or 143H fails, the power conversion device 100B can be controlled using a control method which will be described below.

The control circuit 300 turns off the FETs 801 and 802, turns off the FETs 142H and 143H other than the failed FET 141H, and turns on the FETs 141L, 142L, and 143L. The FET 801 blocks connection between the second inverter 140 and the power supply 101, and the FET 802 blocks connection between the second inverter 140 and the GND. By turning on the FETs 141L, 142L, and 143L, the node N4 on the low side functions as a neutral point of each winding. The power conversion device 100B can drive the motor 200 using the first inverter 110 and the neutral point configured on the low side of the second inverter 140.

Figure 15:
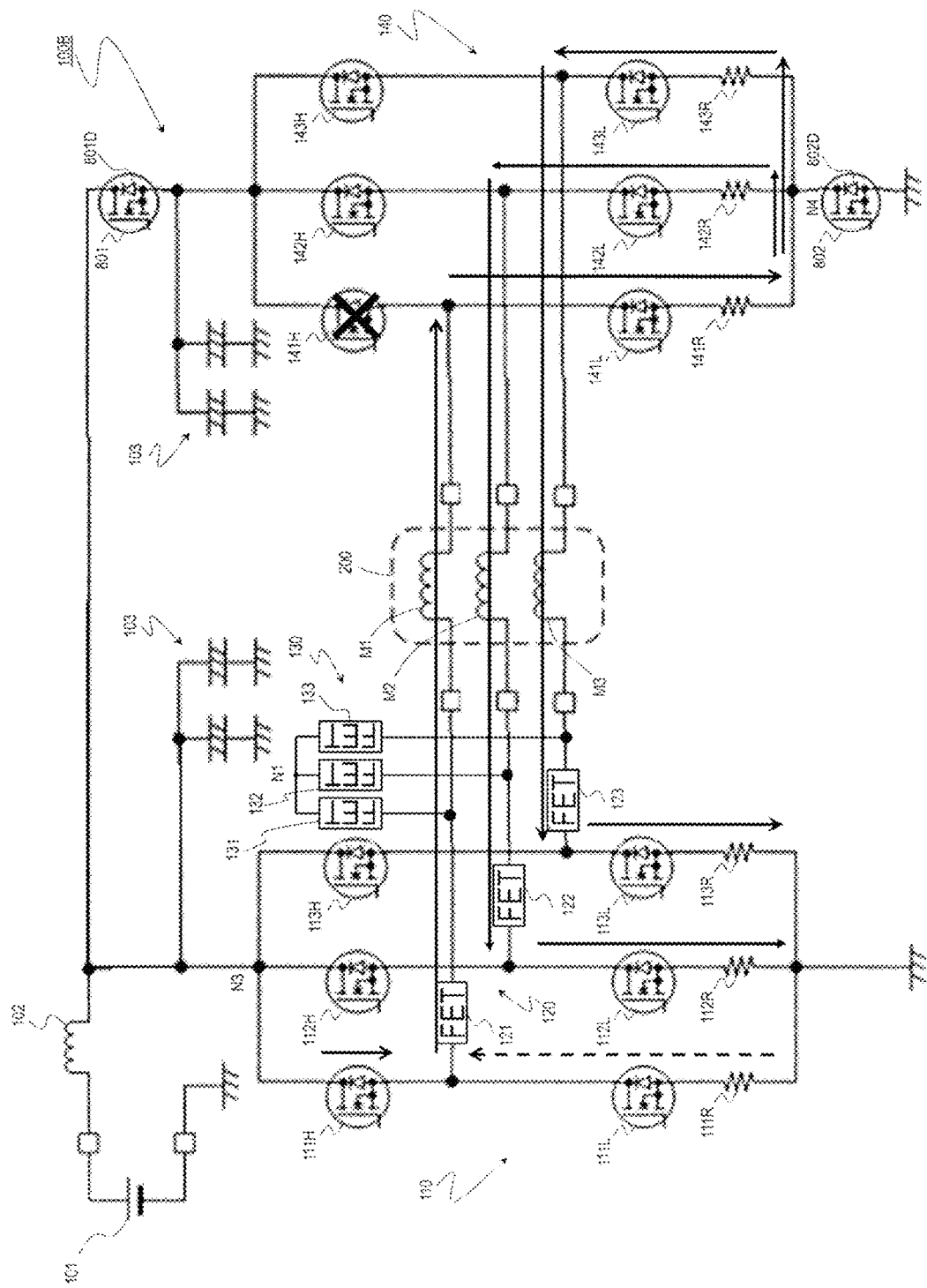
FIG. 15 is a schematic diagram illustrating the flow of current in the power conversion device 100B at, for example, a motor electrical angle of 90° in the case in which a high side switching element of a second inverter 140 fails.

FIG. 15 schematically illustrates the flow of current in the power conversion device 100B at the electrical angle of 90°.

FIG. 15 shows an example of the flow of current flowing through the U-phase, V-phase, and W-phase windings at the electrical angle of 90° of the current waveform shown in FIG. 7. Each of the three solid lines represents the current flowing from the power supply 101 to the motor 200, and the broken line represents the regenerative current returning to the winding M1 of the motor 200.

At the electrical angle of 90°, in the first inverter 110, the FETs 111H, 112L, and 113L are in the on state, and the FETs 111L, 112H, and 113H are in the off state. The current flowing through the FET 111H of the first inverter 110 flows to the neutral point through the FET 121, the winding M1, and the FET 141L of the second inverter 140. A portion of the current flows to the winding M2 through the FET 142L, and the remaining current flows to the winding M3 through the FET 143L. The current flowing through the winding M2 flows to the GND through the FET 122 and the FET 112L. The current flowing through the winding M3 flows to the GND through the FET 123 and the FET 113L. Also, in the freewheeling diode of the FET 111L, a regenerative current flows toward the winding M1 of the motor 200.

For example, at the electrical angle of 30°, the current having the magnitude I2 flows from the bridge circuit L to the bridge circuit R in the U-phase winding M1, the current having the magnitude Ipk flows from the bridge circuit R to the bridge circuit L in the V-phase winding M2, and the current having the magnitude I2 flows from the bridge circuit L to the bridge circuit R in the W-phase winding M3. At the electrical angle of 60°, the current having the magnitude I1 flows from the bridge circuit L to the bridge circuit R in the U-phase winding M1, and the current having the magnitude I1 flows from the bridge circuit R to the bridge circuit L in the V-phase winding M2. No current flows through the W-phase winding M3. The sum of the current flowing into the neutral point and the current flowing out of the neutral point is always "0" for every electrical angle. For example, the control circuit 300 can control the switching operation of each FET of the bridge circuit L by PWM control such as obtaining the current waveform shown in FIG. 7. Further, the positive and negative signs of the values of current flowing in the bridge circuit L are opposite to those of the values of current flowing in the bridge circuit R shown in Table 2.

In the case in which a high side switching element has an open failure, the FET 801 may be in the on state. In other words, the FET 801 may be in the on or off state. The reason why the FET 801 may be turned on is that, in the case in which the FET 141H has an open failure, all the high side switching elements are in an open state by controlling the FETs 142H and 143H to be in the off state, and thus, no current flows from the power supply 101 to the second inverter 140 even when the FET 801 is turned on.

In the case in which the three high side switching elements (FETs 141H, 142H, and 143H) in the second inverter 140 include a switching element having a short failure, the control circuit 300 turns off the FETs 801 and 802, turns off all the switching elements other than the failed switching element among the three high side switching elements, and turns on all of the three low side switching elements. Further, in the case of a short failure, because current flows from the power supply 101 to the short-circuited FET 141H when the FET 801 is turned on, the on state of the FET 801 is prohibited.

As in the open failure, the power conversion device 100B can drive the motor 200 using the first inverter 110 and the neutral point configured on the low side of the second inverter 140.

Further, in the case in which the FET 141H has a short failure, for example, a regenerative current flows to the FET 141H through the freewheeling diode of the FET 142H at the motor electrical angles of 180° to 300° illustrated in FIG. 7, and a regenerative current flows to the FET 141H through the freewheeling diode of the FET 143H at the motor electrical angles of 240° to 360° illustrated in FIG. 7. In this manner, in the case of a short failure, in a certain range of motor electrical angle, the current can be distributed to the high side through the FET 142H or FET 143H.

In the case in which the three low side switching elements (FETs 141L, 142L, and 143L) in the second inverter 140 include a switching element having an open failure, in principle, the control circuit 300 turns off the FETs 801 and 802, turns off all the switching elements other than the failed switching element among the three low side switching elements, and turns on all of the three high side switching elements.

It is assumed that the FET 141L has failed among the three low side switching elements. Further, even in the case in which the FET 142L or 143L fails, the power conversion device 100B can be controlled using a control method which will be described below.

The control circuit 300 turns off the FETs 801 and 802, turns off the FETs 142L and 143L other than the failed FET 141L, and turns on the FETs 141H, 142H, and 143H. The FET 801 blocks connection between the second inverter 140 and the power supply 101, and the FET 802 blocks connection between the second inverter 140 and the GND. By turning on the FETs 141H, 142H, and 143H, the node N6 on the high side functions as a neutral point of each winding. The power conversion device 100B can drive the motor 200 using the first inverter 110 and the neutral point configured on the high side of the second inverter 140.

Figure 16:
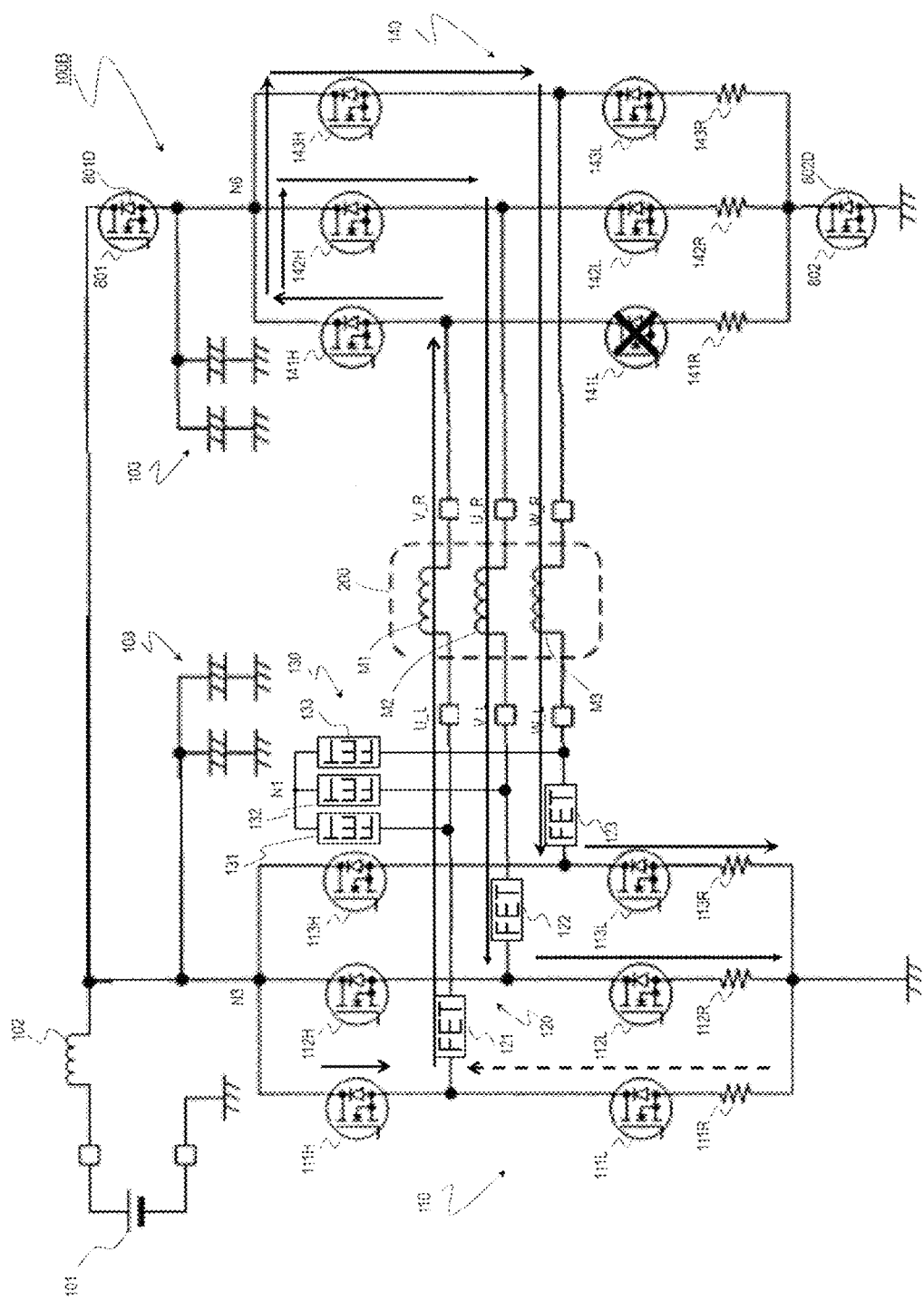
FIG. 16 is a schematic diagram illustrating the flow of current in the power conversion device 100B at, for example, the motor electrical angle of 90° in the case in which a low side switching element of the second inverter 140 fails.

FIG. 16 schematically illustrates the flow of current in the power conversion device 100B at the electrical angle of 90°.

FIG. 16 shows an example of the flow of current flowing through the U-phase, V-phase, and W-phase windings at the electrical angle of 90° of the current waveform shown in FIG. 7. Each of the three solid lines represents the current flowing from the power supply 101 to the motor 200, and the broken line represents the regenerative current returning to the winding M1 of the motor 200.

At the electrical angle of 90°, in the first inverter 110, the FETs 111H, 112L, and 113L are in the on state, and the FETs 111L, 112H, and 113H are in the off state. The current flowing through the FET 111H of the first inverter 110 flows to the neutral point through the FET 121, the winding M1, and the FET 141H of the second inverter 140. A portion of the current flows to the winding M2 through the FET 142H, and the remaining current flows to the winding M3 through the FET 143H. The current flowing through the winding M2 flows to the GND through the FET 122 and the FET 112L. The current flowing through the winding M3 flows to the GND through the FET 123 and the FET 113L. Also, in the freewheeling diode of the FET 111L, a regenerative current flows toward the winding M1 of the motor 200.

For example, the control circuit 300 can control the switching operation of each FET of the bridge circuit L by PWM control such as obtaining the current waveform shown in FIG. 7.

In the case in which a low side switching element has an open failure, the FET 802 may be in the on state. In other words, the FET 802 may be in the on or off state. The reason why the FET 802 may be turned on is that, in the case in which the FET 141L has an open failure, all the low side switching elements are in an open state by controlling the FETs 142L and 143L to be in the off state, and thus no current flows from the second inverter 140 to the GND even when the FET 802 is turned on.

In the case in which the three low side switching elements (FETs 141L, 142L, and 143L) in the second inverter 140 include a switching element having a short failure, the control circuit 300 turns off the FETs 801 and 802, turns off all the switching elements other than the failed switching element among the three low side switching elements, and turns on all of the three high side switching elements. Further, in the case of a short failure, because current flows to the GND through the short-circuited FET 141L when the FET 802 is turned on, the on state of the FET 802 is prohibited.

As in the open failure, the power conversion device 100B can drive the motor 200 using the first inverter 110 and the neutral point configured on the high side of the second inverter 140.

For example, at the electrical angle of 90°, different from in the open failure, current also flows to the FET 141L which is short circuited, and the current flowing through the FET 141L is branched to each of the freewheeling diodes of the FETs 142L and 143L through the node N4 on the low side.

In this manner, at the time of the short failure, it becomes possible to distribute current toward the high side and the low side of the second inverter 140. As a result, thermal effects on the inverter can be reduced.

According to the present example embodiment, the same effect as in the first example embodiment can be obtained by providing the two switching elements 801 and 802, instead of a phase separation relay circuit and a neutral point relay circuit, in the second inverter 140. Furthermore, because the number of FETs necessary may be smaller as compared with the first example embodiment, cost reduction of the power conversion device is expected.

The example embodiments of the present disclosure can be widely used in various devices including various motors, such as a vacuum cleaner, a dryer, a ceiling fan, a washing machine, a refrigerator, and an electric power steering device.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A power conversion device that converts power from a power supply to power supplied to a motor having n-phase windings where n is an integer of 3 or more, the power conversion device comprising:
   a first inverter connected to first ends of the windings of each phase of the motor;
   a second inverter connected to second ends of the windings of each phase;
   a phase separation relay circuit to switch between connection and disconnection between the first ends of the windings of each phase and the first inverter;
   a neutral point relay circuit connected to the first ends of the windings of each phase and to switch between connection and disconnection between the first ends of the windings of each phase;
   a first switching element to switch between connection and disconnection between the second inverter and the power supply; and
   a second switching element to switch between connection and disconnection between the second inverter and a ground.

2. The power conversion device according to claim 1, wherein:
   the phase separation relay circuit includes n switching elements to switch between connection and disconnection between the first ends of the windings of each phase and the first inverter; and
   the neutral point relay circuit includes n switching elements to switch between connection and disconnection between the first ends of the windings of each phase.

3. The power conversion device according to claim 2, wherein each of the n switching elements in each of the phase separation relay circuit and the neutral point relay circuit is a semiconductor switching element including a freewheeling diode, and in each circuit, n freewheeling diodes are directed in a same direction.

4. The power conversion device according to claim 3, wherein each of the n switching elements in each of the phase separation relay circuit and the neutral point relay circuit is arranged such that a forward current flows in the freewheeling diode toward the motor.

5. The power conversion device according to claim 1, wherein, during a normal operation, the phase separation relay circuit is turned on, the neutral point relay circuit is turned off, and the first and second switching elements are turned on.

6. The power conversion device according to claim 1, wherein, when the phase separation relay circuit is turned off, and the neutral point relay circuit is turned on, a neutral point of the windings of each phase is provided by connection between the first ends of the windings of each phase.

7. The power conversion device according to claim 6, wherein, when the first inverter is abnormal, the neutral point is provided by turning off the phase separation relay circuit and turning on the neutral point relay circuit, and the first and second switching elements are turned on.

8. The power conversion device according to claim 1, wherein, when the second inverter is abnormal, the phase separation relay circuit is turned on, and the neutral point relay circuit is turned off.

9. The power conversion device according to claim 8, wherein:
   a bridge circuit of the second inverter includes n legs each including a low side switching element and a high side switching element; and
   in a case in which the n high side switching elements in the bridge circuit include a switching element having an open failure, the second switching element is turned off, all the switching elements other than the failed switching element are turned off among the n high side switching elements in the bridge circuit, and all of the n low side switching elements are turned on.

10. The power conversion device according to claim 8, wherein:
    a bridge circuit of the second inverter includes n legs each including a low side switching element and a high side switching element; and
    in a case in which the n high side switching elements in the bridge circuit include a switching element having a short failure, the first and second switching elements are turned off, all the switching elements other than the failed switching element are turned off among the n high side switching elements in the bridge circuit, and all of the n low side switching elements are turned on.

11. The power conversion device according to claim 8, wherein:
    a bridge circuit of the second inverter includes n legs each including a low side switching element and a high side switching element; and
    in a case in which the n low side switching elements in the bridge circuit include a switching element having an open failure, the first switching element is turned off, all the switching elements other than the failed switching element are turned off among the n low side switching elements in the bridge circuit, and all of the n high side switching elements are turned on.

12. The power conversion device according to claim 8, wherein:
    a bridge circuit of the second inverter includes n legs each including a low side switching element and a high side switching element; and
    in a case in which the n low side switching elements in the bridge circuit include a switching element having a short failure, the first and second switching elements are turned off, all the switching elements other than the failed switching element are turned off among the n low side switching elements in the bridge circuit, and all of the n high side switching elements are turned on.

13. The power conversion device according to claim 1, wherein the power supply is a single power supply.

14. A motor drive unit comprising:
a motor;
the power conversion device according to claim 1; and
a control circuit to control the power conversion device.

15. An electric power steering device comprising the motor drive unit according to claim 14.

* * * * *